(12) United States Patent
McCarthy

(10) Patent No.: US 12,328,315 B2
(45) Date of Patent: Jun. 10, 2025

(54) METHODS AND SYSTEMS FOR USER AUTHENTICATION AND FILE ACCESS CONTROL

(71) Applicant: Inkit, Inc., Wilmington, DE (US)

(72) Inventor: Michael McCarthy, Wilmington, DE (US)

(73) Assignee: Inkit, Inc., Wilmington, DE (US)

( * ) Notice: Subject to any disclaimer, the term of this patent is extended or adjusted under 35 U.S.C. 154(b) by 0 days.

(21) Appl. No.: 18/400,311

(22) Filed: Dec. 29, 2023

(65) Prior Publication Data

US 2025/0030691 A1 Jan. 23, 2025

Related U.S. Application Data

(60) Provisional application No. 63/515,077, filed on Jul. 21, 2023.

(51) Int. Cl.
| | |
|---|---|
| *G06F 15/16* | (2006.01) |
| *G06F 21/62* | (2013.01) |
| *G06F 40/186* | (2020.01) |
| *H04L 9/40* | (2022.01) |

(52) U.S. Cl.
CPC ........ *H04L 63/101* (2013.01); *G06F 21/6209* (2013.01); *G06F 40/186* (2020.01); *H04L 63/08* (2013.01); *H04L 63/108* (2013.01)

(58) Field of Classification Search
CPC ..... H04L 63/08; H04L 63/101; H04L 63/108; G06F 21/6209; G06F 40/186
USPC ........................................................ 709/225
See application file for complete search history.

(56) References Cited

U.S. PATENT DOCUMENTS

| | | | |
|---|---|---|---|
| 6,256,739 B1 * | 7/2001 | Skopp | H04L 63/101 709/229 |
| 7,627,726 B2 | 12/2009 | Chandrasekaran et al. | |
| 8,418,238 B2 * | 4/2013 | Platt | H04L 63/20 726/8 |
| 8,700,576 B2 | 4/2014 | Stakutis et al. | |
| 8,745,227 B2 * | 6/2014 | Layton | H04L 63/10 709/227 |
| 8,990,911 B2 * | 3/2015 | Olden | H04L 63/0815 726/28 |

(Continued)

*Primary Examiner* — Moustafa M Meky
(74) *Attorney, Agent, or Firm* — Bryan L. Baysinger; Thomas R. Parker; Maynard Nexsen PC

(57) ABSTRACT

The present disclosure relates to methods for administering access to generated files. The method involves storing a file on a server. The server receives a request from a first client device to generate a uniform resource identifier (URI) associated with the file, an identity, and a dynamic expire time. The server generates the URI, which links to a resource comprising the file, and transmits it to a second client device. The server then receives a request from the second client device using the URI to request the resource. The server validates the identity by checking it against a database of authorized identities. Additionally, the server validates the identity through an identity provider, which prompts the user to login to the identity on an identity hosting platform. Based on the response from the server and the identity provider, access to the resource is granted or denied. Based on that access and retention parameters, viewing is allowed, or may be removed if credentials such as viewing time or count is exceeded or biometric scan fail.

20 Claims, 16 Drawing Sheets

(56) References Cited

U.S. PATENT DOCUMENTS

| | | | |
|---|---|---|---|
| 9,658,872 B1* | 5/2017 | Hanna | G06F 9/4451 |
| 9,794,239 B1* | 10/2017 | Chaudhry | G06F 21/34 |
| 9,893,895 B2 | 2/2018 | Peterson et al. | |
| 10,078,757 B2* | 9/2018 | Ow | G06F 21/6245 |
| 10,275,609 B2* | 4/2019 | Ow | G06F 21/6245 |
| 10,643,004 B2* | 5/2020 | Fortmann | G06F 21/6272 |
| 10,970,412 B2* | 4/2021 | Ow | G06F 16/183 |
| 11,132,456 B2* | 9/2021 | Ow | H04L 65/403 |
| 11,855,871 B1* | 12/2023 | Olden | H04L 63/08 |
| 12,041,039 B2* | 7/2024 | Lindemann | H04L 9/3247 |
| 2003/0200442 A1* | 10/2003 | Bhat | H04L 63/102 |
| | | | 713/182 |
| 2005/0076066 A1 | 4/2005 | Stakutis et al. | |
| 2005/0193030 A1 | 9/2005 | Abe | |
| 2005/0203969 A1 | 9/2005 | Kawabe | |
| 2009/0248954 A1 | 10/2009 | Hiraiwa et al. | |
| 2010/0228700 A1 | 9/2010 | Stakutis et al. | |
| 2014/0101434 A1* | 4/2014 | Senthurpandi | G06F 12/1408 |
| | | | 713/150 |
| 2014/0165176 A1* | 6/2014 | Ow | G06F 16/183 |
| | | | 726/8 |
| 2015/0371057 A1* | 12/2015 | Ow | H04L 63/0815 |
| | | | 726/28 |
| 2017/0060885 A1 | 3/2017 | Gangadharalah et al. | |
| 2017/0287090 A1 | 10/2017 | Hunn et al. | |
| 2018/0005183 A1 | 1/2018 | Hunn | |
| 2018/0276232 A1 | 9/2018 | Dhanasekaran et al. | |
| 2018/0336371 A1* | 11/2018 | Fortmann | G06F 21/6281 |
| 2022/0012353 A1* | 1/2022 | Ow | G06F 16/183 |
| 2022/0245270 A1* | 8/2022 | De Araujo | G16H 40/67 |

\* cited by examiner

```
{
    "Request_Type": "Document_Generation"
    "Document_Template_ID": "Doc_Tmp_E40AF12F",
    "Security_Template_ID": "Sec_Tmp_8A92BE0C",
    "Flow_Template_ID": "Flw_Tmp_63BF1909",
    "Merge_Parameters":
        {
            "Dynamic_Logo": "https://fe80:0000:0000:0000:0000:0000:0000:0000/dynamic_logo_1.png",
            "Dynamic_Address":
                {
                    "Dynamic_Address_Line_1": "123 Maple Street",
                    "Dynamic_Address_Line_2": "Apt. 100",
                    "Dynamic_Address_City": "Anytown",
                    "Dynamic_Address_State": "Alabama",
                    "Dynamic_Address_ZIP_Code": "00000-0000",
                    "Dynamic_Address_Country": "United States"
                },
            "Dynamic_Salutation": "Mr.",
            "Dynamic_Name":
                {
                    "Dynamic_First_Name": "John",
                    "Dynamic_Middle_Name": "Luke",
                    "Dynamic_Last_Name": "Smith"
                },
            "Dynamic_Text_1": "Lorem ipsum...",
            "Dynamic_Text_2": "Lorem ipsum...",
            "Dynamic_Text_3": "Lorem ipsum...",
            "Dynamic_Text_4": "Lorem ipsum...",
            "Dynamic_Nested_Template_1_ID": "Doc_Tmp_2E06E2D1"
        },
    "Security_Parameters":
        {
            "Number_of_Allowed_Views": -1,
            "Deletion_Date": 1735689600
        },
    "Flow_Parameters":
        {
            "Storage_Location": "Native"
        }
}
```

FIG. 8

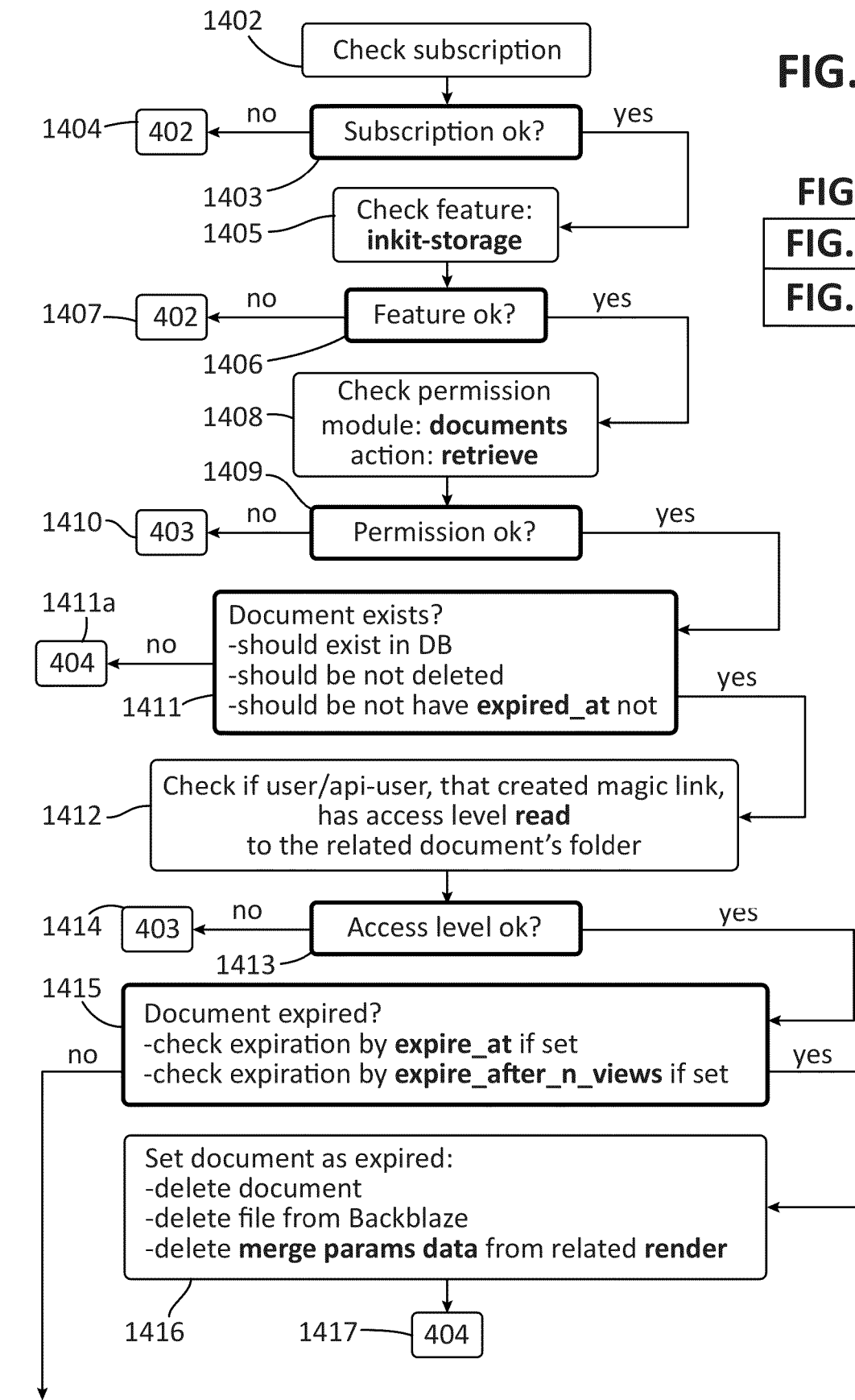

METHODS AND SYSTEMS FOR USER AUTHENTICATION AND FILE ACCESS CONTROL

CROSS-REFERENCE TO RELATED APPLICATIONS

The present application claims the benefit and priority of U.S. Provisional Patent Application No. 63/515,077, filed on Jul. 21, 2023, entitled "Systems and Methods for Document Generation and Automatic Deletion Based on Parameterized Conditions", the contents of which is hereby incorporated in the entirety.

FIELD

The present disclosure generally relates to data management, and more particularly, methods, systems, apparatuses, and non-transitory computer readable media for file generation, storage, and deletion.

BACKGROUND

For many, if not most, modern-day organizations, an important aspect of their ongoing operations is the creation, communication, and retention of various files to the organization's relevant stakeholders. In addition to communicating information, these files—with regards to both their transmission and their retention—may serve a variety of other purposes, such as formally fulfilling a contractual request or satisfying a regulatory obligation. However, the sheer volume of files, even when restricted to only "formal" files suitable for official communication with external parties, is vast, ranging from contracts and invoices to informational notices and certificates. Producing such a large volume of files manually would be highly inefficient, consuming valuable human capital on a mundane task while significantly increase the rate of errors. A similar problem arises with regards to ensuring that produced files are retained for an appropriate amount of time and then deleted.

Various methods have been developed for managing access to generated files in a networked environment. In traditional systems, files are typically stored on a server and accessed by clients through a direct link or by providing the file's location on the server. However, this approach may not provide sufficient security measures to control access to the files and ensure that only authorized users can view or modify them, as well as set expiration or deletion triggering events.

One approach to address this issue is the use of uniform resource identifiers (URIs) to manage access to files. URIs are unique identifiers that can be used to locate and access resources on the internet. In some existing systems, a server generates a URI associated with a file and provides it to a client device. The client device can then use the URI to request the resource from the server. However, these systems may not have robust mechanisms to validate the identity of the user making the request, potentially allowing unauthorized access to the resource.

Another approach involves validating the identity of the user requesting access to the resource. This can be done through the server itself, where the server checks the identity against a database of authorized identities. However, this approach may not be sufficient to ensure the authenticity of the identity, as the server may not have direct access to the user's identity information. To address this limitation, some systems involve using an identity provider, which requests the user to log in to their identity on an identity hosting platform. The identity provider can then validate the user's identity and provide the necessary authentication information to the server.

However, none of these approaches have provided a comprehensive solution that combines the features described in this disclosure. The present invention aims to provide a method for managing access to generated files that addresses the limitations of existing approaches by utilizing a combination of storing files in non-volatile memory, generating URIs associated with the files, validating the identity through the server and an identity provider, and granting or denying access based on the response from both entities. Thus, there is a long sought need to develop systems that are capable of significantly reducing the burden incurred during the process of file generation, storage, and retention-including access control and deletion—are greatly desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 8 is an illustration of the data structure of an exemplary file template, such as the exemplary file template of FIG. 7.

FIG. 14A-B is a flowchart of an exemplary method managing access to generated files.

DETAILED DESCRIPTION

Figure 1:
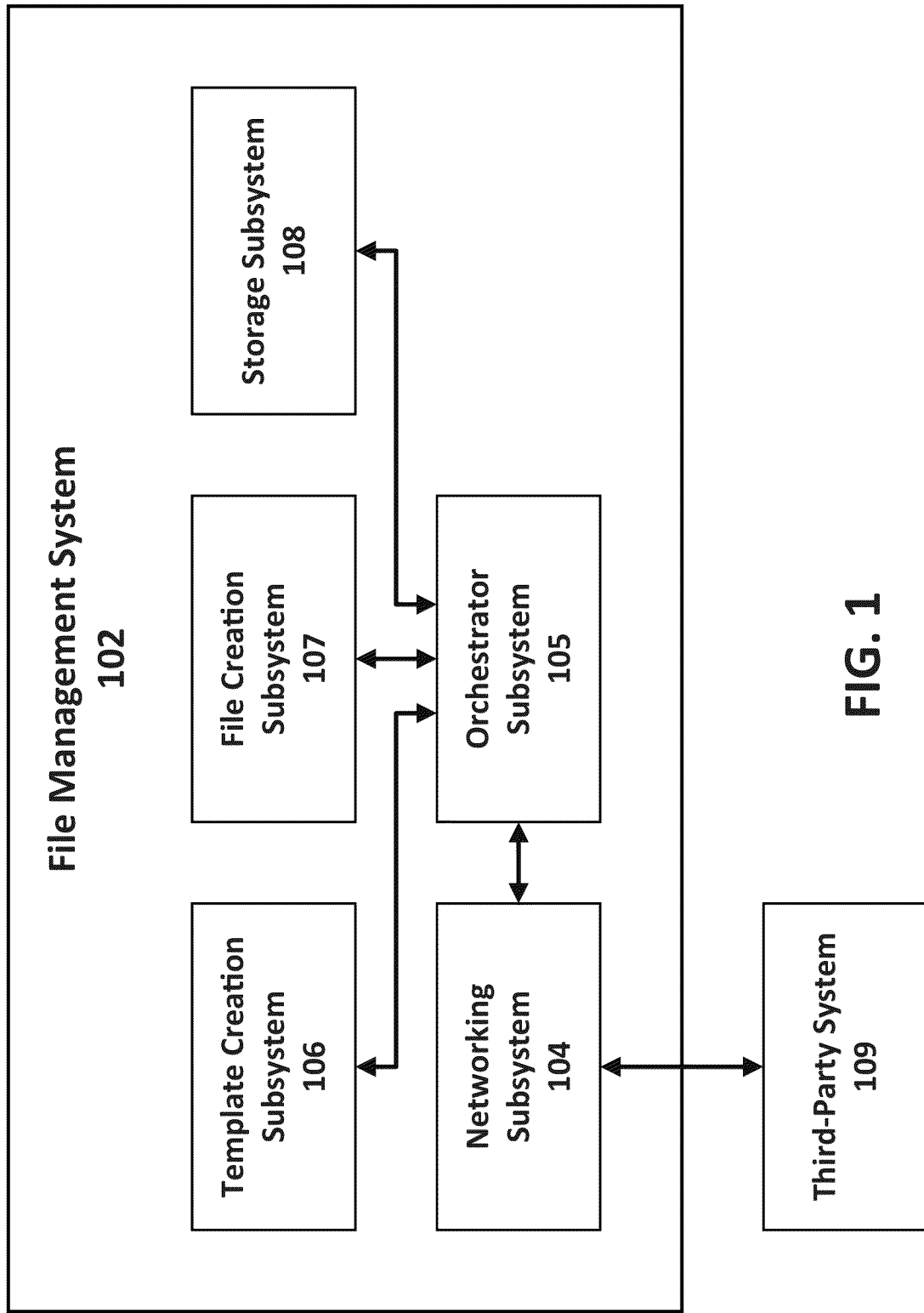
FIG. 1 is a block diagram of an exemplary embodiment of a file generation and management system.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The present disclosure generally pertains to systems and methods for managing file generation and retention. These systems may be of used across a wide range of businesses to significantly automate the generation and storage of files. By utilizing nested file templates as described below, systems of the present disclosure may increase the ease in which a file template may be generated. Moreover, by using the file retention and storage system described below, system of the present disclosure may simplify the process of ensuring files are retained for an appropriate amount of time and further assuring that files are deleted when they no longer need to be retained. Thus, the systems and methods here may aid in compliance with various regulations and may aid the protection of confidential information by destroying or safely erasing/removing files after a deletion-triggering event.

For many, if not most, modern-day organizations, an important aspect of their ongoing operations is the creation, communication, and retention of various files to the organization's relevant stakeholders. These files may serve a variety of purposes, such as to communicate relevant information, make some kind of request, or fulfill some kind of legal obligation. For example, retention of compliance files in the financial and health care industry.

The prevalence of these files generates a problem for businesses. Manually entering all relevant customer information is a time-consuming and cost-prohibitive task. Organization's need the ability to automate this process, and to allow for creation of files that will populate fields based on certain conditions. For example, if a file is generated that must also comply with each given State law, then each respective generated file will populate not only the respective fields, but also generate the applicable State portions.

At a high-level, embodiments of the present disclosure may generate a file from a file template in response to receiving a file generation request, among other information possible information, the file generation request may indicate a template to be used and one or more entries of information to be used to populate the file template. As discussed further below, this process may involve generating one or more sub-files—from one or more templates-referred to as sub-templates-via the same process. This process may continue to recursively occur through multiple layers of sub-files (i.e., sub-files of sub-files). Ultimately, the final generated file may be stored in file storage system, where the file is associated with metadata, triggering parameters, and or action items that automatically controls the retention and deletion of the file, as detailed further below.

In a first embodiment a method for generating files with nested templates is disclosed. In one aspect of the first embodiment, a first server may receive a first file template creation request from a client device. In response to receiving the first file template creation request, the first server may generate a first file template with static content data and dynamic content markers. The static content data and the dynamic content data may comprise, amongst other things, positioning information as to position the content at a particular location on a file. For example, the positioning location may provide for an x/y coordinate system to position the content on a text document or a pdf document. In other aspects, it may provide for a pixel location coordinate system. In yet further aspects, metadata from a file may be employed for the files positioning. Even further, Cartesian, cylindrical, and spherical systems may be employed for positioning within a file or document.

Later, in the first embodiment, the first server may receive a first file creation request from the client device. In general, the first file creation request may comprise a set of one or more merge parameter data structures. In response to receiving the first file creation request, the first server a copy of the first file template with the static content data and the dynamic content markers. In general, the one or more dynamic content markers of the first file template are each associated with a respective merge parameter identifier. The first server may then insert merge parameter data into the one or more dynamic content markers of the copy of the first file template using a set of one or more merge parameter data structures. In general, the set of one or more merge parameter data structures each comprise a respective merge parameter identifier and a respective merge parameter data source and the merge parameter data is obtained from one or more respective merge parameter data sources.

In a second embodiment a computer implemented method for managing generated files is disclosed. In one aspect of the second embodiment, the first server may receive a first file template creation request from a client device. In response to receiving the first file template creation request, the first server may generate a first file template with static content data and dynamic content markers. Later, the first server may receive a first file creation request from the client device. In response to receiving the first file creation request, the first server may generate a first file from the first file template. The first server may then store the first file in non-volatile memory accessible by the first server. Later, the first server may detect a deletion-triggering event. In response to detecting the deletion-triggering event, the first server may delete the first document from the non-volatile memory, or may remove the file from access, or may lock the file and limit it to administrative access only.

In a third embodiment a method for managing access to generated files displayed on a third-party application is disclosed. In one aspect of the third embodiment, a first server may store a first file created from a file template in non-volatile memory accessible by the first server. Later, the first server may receive a request to connect with respect to a first user account of the first server. In general, this request to connect is received from a second server that is associated with a third-party portal. Additionally, the first user account is generally associated with a first user. In response to receiving the request to connect, the first server may authenticate the second server for connecting to the first user account based on the received request to connect with the first user account. In response to authenticating the second server, the first server may generate a first uniform resource identifier (URI) associated with the first file. In general, the first URI links to a first resource comprising the first file.

After generating the first URI, the first server may transmit the first URI and information identifying the first file to the second server. Subsequently, the first server may detect a deletion-triggering event. In response to detecting the deletion-triggering event, the first server may delete the first document from the non-volatile memory.

In a fourth embodiment a method for managing access to generated files is disclosed. In one aspect of the fourth embodiment, a server may store a file in non-volatile memory accessible by the server. Subsequently, the sever may receive from a first client device a request to generate a uniform resource identifier (URI). In general, the first URI is associated with the file, an identity (email, login, username, phone number, generated passcode, etc), and a dynamic expire time; In response to receiving the request to generate a URI, the first server generates a uniform resource identifier (URI) associated with the file. In general, the generated URI links to a resource comprising the file and is generated at the server. After generating the URI, the server may, at the request of the first client device, transmit the URI to a second client device.

After transmitting the URI to the second client device, the server may receive from a second client device a request using the URI to request the resource. In response, the server may validate the identity through the server as an authorized identity (username, phone number, passcode, email, login credentials). To do so, the server may check that the identity is contained in a database of authorized identities in the server. The server may also validate the identity through an identity provider, wherein the identity provider requests the user to login to the identity on an identity hosting platform. The server may then grant or deny access to the resource based on a response from the server and the identity provider.

In a fifth embodiment, a method for generating files with nested templates is disclosed. In one aspect of the first embodiment, a first file template may be generated. In general, the first file template may comprise static content data and dynamic content markers.

In one aspect of the fifth embodiment, a copy of the first file template may be created. In general, the copy of the first file template may include both the static content data and the dynamic content markers from the first template. The dynamic content markers of the first file template—and thus the copy of these dynamic content markers in the copy of the first file template—may each be associated with a respective merge parameter identifier.

In one aspect of the fifth embodiment, merge parameter data may be inserted at the location of the one or more dynamic content markers of the copy of the first file template. Generally, the merge parameter data is obtained from a set of one or more merge parameter comprise at least a name (merge parameter identifier) and a data type (merge parameter data source), and may comprise formats such as JSON, XML, YAML, to name a few. Each merge parameter structure may comprise a merge parameter identifier and a merge parameter data source. Merge parameter data may be obtained from a merge parameter data source, and the collective merge parameter data may similarly be obtained from the collective merge parameter data sources of the entire set of one or more merge parameter tuples.

Generally, the dynamic markers are removed from the copy of the first file template, either explicitly or implicitly as part of the insertion process (e.g., the dynamic content markers are replaced).

In an additional aspect of the fifth embodiment, the first file template may be stored in non-volatile memory after it is generated.

In an additional aspect of the fifth embodiment, a file generation request may be received from a client device. Among other potential data, the file generation request may contain a first file template identifier and the set of one or more merge parameter tuples mentioned previously. Generally speaking, the first file template identifier may be associated with the first file template, allowing the request to identify the template the requested file should be based on. Receiving the file generation request may, among other effects, trigger the creation of the copy of the first file template.

In an additional aspect of the fifth embodiment, the copy of the first file request may be transmitted to a first destination. As mentioned above, when the merge parameter data has been inserted into all of the dynamic data markers of the first copy of the first file template, the first file template-which may be thought of as being "filled out"-represents a fully generated file. Because it is usually the fully generated file that is desired, the copy of the first file template is typically only transmitted after the merge parameter data has been inserted into every dynamic content markers of the first file template. The first destination may be associated with a first destination identifier. The first destination identifier may be indicated in the file generation request.

In an additional aspect of the fifth embodiment, the first destination identifier may be associated with native non-volatile memory. Correspondingly, the first copy of the first file template may be stored in the native non-volatile memory after it is generated.

In an additional aspect of the fifth embodiment, the process of inserting the merge parameter data at each one of the one or more dynamic content markers of the copy of the first file template may begin by first identifying a merge parameter tuple from the set of one or more merge parameter tuples The merge parameter tuple can be identified by comparing each merge parameter tuple's associated merge parameter identifier to the merge parameter identifier associated with a current dynamic content marker. The merge parameter tuple containing a merge parameter identifier matching the merge parameter identifier associated with the current dynamic content marker may then be selected.

Next, merge parameter data may be obtained from the merge parameter data source indicated by the selected merge parameter tuple. Then, the obtained merge parameter data may be inserted at the location of the current dynamic content marker. This process may then be repeated for the next remaining dynamic content markers that have not yet had merge parameter data inserted.

In an additional aspect of the fifth embodiment, at least of the one or more merge parameter tuples may comprise a merge parameter data source containing a native data payload. Additionally, at least one of the one or more merge parameter tuples may comprise a merge parameter data source containing a remote data pointer.

In an additional aspect of the fifth embodiment, at least a first merge parameter tuple from the identified merge parameter tuples comprises a first merge parameter data source that indicates a second file template. Obtaining the merge parameter data from this first merge parameter data source may be achieved by recursively generating a sub-file. The process of recursively generating the sub-file may start with creating a copy of the second file template. Next, merge parameter data may be inserted at the one or more dynamic content markers of the copy of the second file template using the set of one or more merge parameter tuples. Then, the generated sub-file may be inserted at the associated dynamic content marker of the copy of the first file template.

In an additional aspect of the fifth embodiment, the second file template is associated second file template identifier. The first merge parameter data source may indicate the second file template by identifying the second file template with the second file template identifier.

In a sixth embodiment, a method for managing storage and deletion of generated files is disclosed. In one aspect of the sixth embodiment, a first file may be generated from a first file template. In another aspect of the sixth embodiment, the first file may be stored in non-volatile memory after being generated. In another aspect of the sixth embodiment, the non-volatile memory may be monitored to detect a deletion-triggering event. In another aspect of the sixth embodiment, the first file may be deleted from the non-volatile memory in response to detecting the deletion-triggering event.

In an additional aspect of the sixth embodiment, the deletion-triggering event may comprise a combination of one or more parameters. For example, in one aspect the deletion triggering event may comprise a combination of one or more of (i) time since generating the first file (length, duration, set amount); (ii) user views; (iii) IP address or viewing address; (iv) time (length, duration, measured) spent viewing the first file; or (v) date of expiration; or (vi) response to a biometric scan.

In an additional aspect of the sixth embodiment, the deletion-triggering event may be the passage of a first amount of time since a date associated with the generation of the first file. In an additional aspect of the sixth embodiment, the deletion-triggering event may be an amount of times the first file is accessed exceeds a first access limit threshold. In an additional aspect of the sixth embodiment, the first file template may be generated. For example, in one aspect the first file template may comprise static content data and dynamic content markers. To generate the first file from the first file template, a copy of the first file template may be created. In general, the copy of the first file template may include both the static content data and the dynamic content markers from the first template. The dynamic content markers of the first file template—and thus the copy of these dynamic content markers in the copy of the first file template—may each be associated with a respective merge parameter identifier.

Next, the merge parameter data may be inserted at the location of the one or more dynamic content markers of the copy of the first file template. Generally, the merge parameter data is obtained from a set of one or more merge parameter tuples. Each merge parameter tuple may comprise a merge parameter identifier and a merge parameter data source. Merge parameter data may be obtained from a merge parameter data source, and the collective merge parameter data may similarly be obtained from the collective merge parameter data sources of the entire set of one or more merge parameter tuples.

In a seventh embodiment, a method for controlling access to generated files is disclosed. In one aspect, a first file may be generated from a first nested file template. In one aspect of the seventh embodiment, the first file may be stored in non-volatile memory. In one aspect of the seventh embodiment, a first uniform resource identifier (URI) associated with the first file may be generated. In general, the first URI may link to a first resource comprising the first file at a data repository or memory location. Continuing, a first URI—along with information identifying the first file—may be provided to an authenticated third-party portal.

In an additional aspect of the seventh embodiment, the URI may be used to access the first file. In particular, a request for the first resource identified by the first URI may be received from the authenticated third-party portal. In general, the request for the first resource may be transmitted in response to input from a first user that is provided to the authenticated third-party portal for accessing the first file. Next, the first resource may be provided to the first user in response to receiving the request for the first resource. In general, providing the first resource to the first user comprises providing the first file to the first user.

In an additional aspect of the seventh embodiment, the third-party portal may be authenticated with respect to a first user account associated with the first user. To start, a request to authenticate the third-party portal with respect to the first user may be received from the third-party portal. In general, the request to authenticate comprises authentication information derived from local login credentials associated with the first user account. Next, the authentication information may be analyzed to verify that the authentication information is derived from the correct login credentials associated with the first user account. Then, in response to verifying the authentication information, a response may be transmitted to the third-party portal indicating that the third-party portal is authenticated with respect to the first user.

In an additional aspect of the seventh embodiment, the response transmitted to the third-party portal may comprise an authentication token for the first user account.

In an additional aspect of the seventh embodiment, the provided information identifying the first file may comprise a title associated with the first file. Additionally, the input from the first user that is provided to the authenticated third-party portal for accessing the first file may comprise input from the first user selecting a displayed title associated with the first user that is hyperlinked to the first URI.

In an additional aspect of the seventh embodiment, the first nested file template may be generated. In an additional aspect of the seventh embodiment, the first nested file template may comprise static content data and dynamic content markers. Additionally, the first file may be generated from the first nested file template in a process starting with creating a copy of the first nested file template with the static content data and the dynamic content markers. In general, the one or more dynamic content markers of the first nested file template may each associated with a respective merge parameter identifier. Next, the merge parameter data may be inserted into the one or more dynamic content markers of the copy of the first nested file template using a set of one or more merge parameter tuples. In general, the set of one or more merge parameter tuples may each comprise a respective merge parameter identifier and a respective merge parameter data source. Additionally, the merge parameter data may be obtained from one or more respective merge parameter data sources.

Referring now to FIG. 1, a block diagram of an exemplary embodiment of a file generation and management system. In the example, a file management system 102 is comprised of a template creation subsystem 106, a file creation subsystem 107, a storage subsystem 108, an orchestrator subsystem 105, and a networking subsystem 104. These subsystems may further be configured to third-party systems 109 to allow information or processing to occur on other platforms.

Continuing, the template creation subsystem 106 includes processing routines for preparing and inserting a template within a file. This placement may be through tags or various other content markers delineating the insertion point within a file. To provide a file, the file creation subsystem 107 may be employed, in which it processes and generates a file that is formatted for the template creation system 106. The storage subsystem 108 is a file repository, typically a cloud repository or other data store that allows access to the created files that may or may not include files with generated templates. The orchestrator system 105 serves as the control subsystem tying the various processing methods together to for a platform that allows the creation of a file, insertion of a template, and storage and linking to the file. Additionally, a networking subsystem 104 may be employed to connect to various other repositories or link to other platforms that may offload processing or storing.

Figure 2:
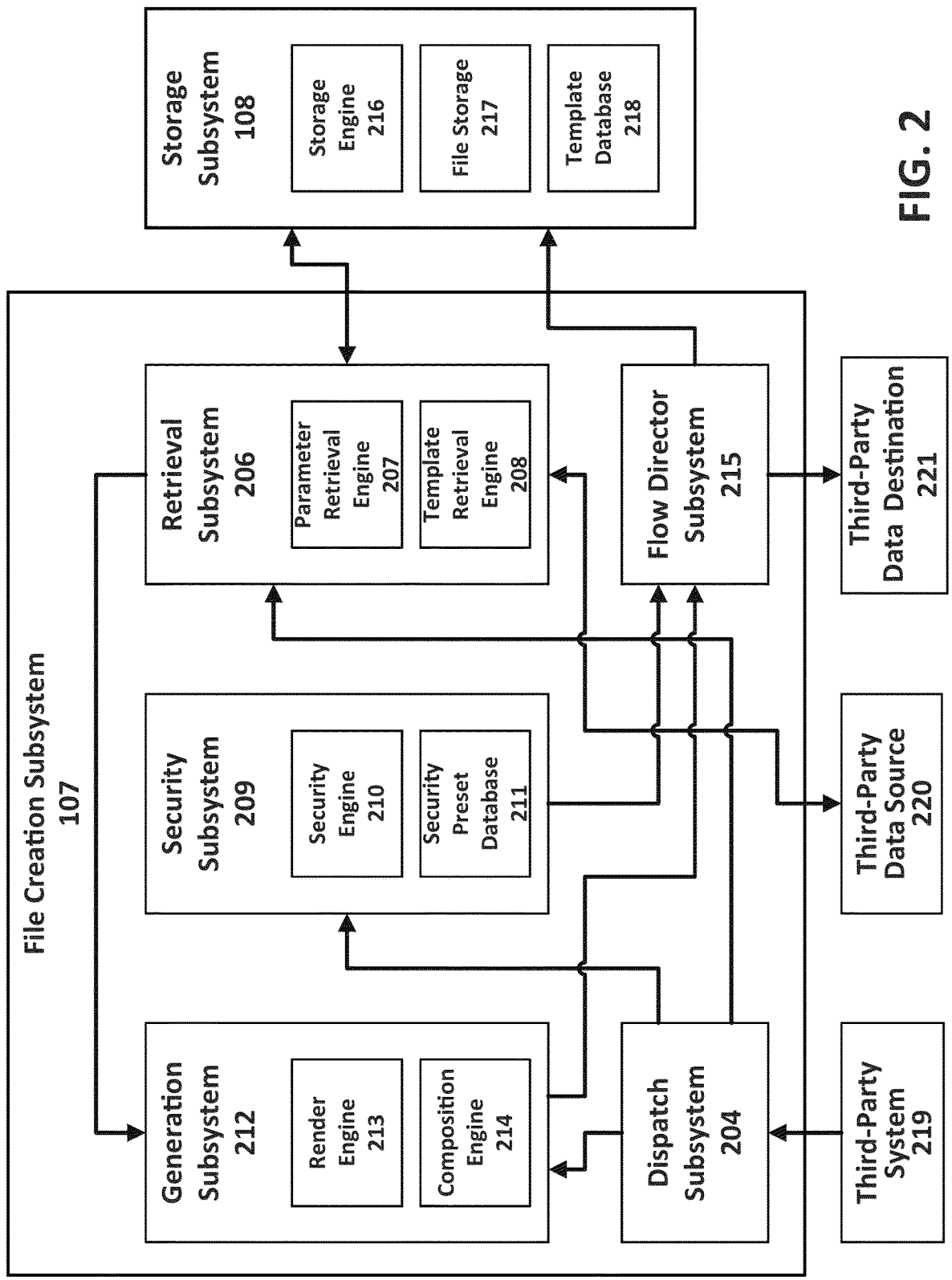
FIG. 2 is a block diagram of an exemplary embodiment of a file creation subsystem.

Referring now to FIG. 2, disclosing a block diagram of a file creation subsystem, in accordance with an exemplary embodiment of the present disclosure. As shown by the figure, a file creation subsystem 107 may comprise a dispatch subsystem 204, a parameter retrieval subsystem 206, a security subsystem 209, a file generation subsystem 212, a flow director subsystem 215, and a storage subsystem 108. Also shown as external elements interacting with the file creation subsystem 107 are third-party system 219, third-party data source 220, and third-party data destination 221.

Broadly speaking, the dispatch subsystem functions to coordinate the operation of the file creation subsystem 107. The dispatch subsystem 204 may also act as the interface between external third-party systems 219 using the file creation subsystem 107 (e.g., for the creation and storage of various files) and the rest of the file creation subsystem. At a high-level, when the dispatch subsystem 204 receives a file generation request, it may interface with the parameter retrieval subsystem 206, the security subsystem 209, and the generation subsystem 212 as part of the process of initiating the handling of the request.

With regards to the parameter retrieval subsystem 206, a file generation request may contain information-referred to as merge parameters—that may be used to fill in a chosen template. In addition to the data be directly included in the file generation request, the file generation request may also specify a source for the indicated data, such as a universal resource identifier (URI). The parameter retrieval subsystem 206 may work to access the indicated URI at the appropriate third-party data source 220, retrieve the indicated data, and provide the retrieved data to the generation subsystem 212 as fully resolved merge parameter.

With regards to the generation subsystem 212, a file generation request may contain an identifier for a file template referred to as the file template ID. This indicated template may be used as the basis for generating the requested file. The generation subsystem 212 may use this information to retrieve (a copy of) the indicated template and may then use the merge parameters provided by the dispatch subsystem 204 and the parameter retrieval subsystem 206 to fill in the dynamic elements of the indicated template.

In particular, as shown by FIG. 2, the file generation subsystem 212 may comprise a render engine 213, a composition engine 214, and a template database 218. Broadly speaking, the render engine 213 may work to first retrieve a copy of the template indicated by the file template ID from the template database 218. The render engine 213 may then proceed to replace the dynamic elements of the template with the matching merge parameters received from the dispatch subsystem 204 and the parameter retrieval subsystem 206.

After the file is generated by the generation subsystem 212, the generated file may be provided to the flow director subsystem 215. The flow director subsystem 215 may then handle the process of transmitting the generated file to its intended destination, repository, or third-party. One such possible destination is the storage subsystem 108, wherein the storage subsystem if a file repository for temporary or long term storage of files. Another possible destination is one or more external third-party data destinations 221, such as a cloud service provider, platform partner, or other repository for performing actions or storing files. For files being stored in the storage subsystem 108, the flow director subsystem may also provide metadata indicating a retention policy for the file. A retention policy, in one example, sets forth triggering events for deletion, removal, or locking of a particular file upon the occurrence of a triggering event.

In particular, as shown by FIG. 2, the file storage subsystem 108 may comprise a storage engine 216 and a file storage 217. Broadly speaking, the storage subsystem 108 may work to perform two interrelated functions. For one function, the storage subsystem 108 may receive a generated file from the flow director subsystem 215 and store the file on the file storage 217 alongside metadata indicating a retention policy for the stored file. For the other function, the storage subsystem 108 may periodically scan through the metadata of generated files stored on the file storage 217 to determine if their associated retention metadata indicates a deletion-triggering event has occurred. For generated files where the storage subsystem 108 determines a deletion-triggering event has occurred, the storage engine 216 may proceed to delete the file from the file storage 217.

Figure 3:
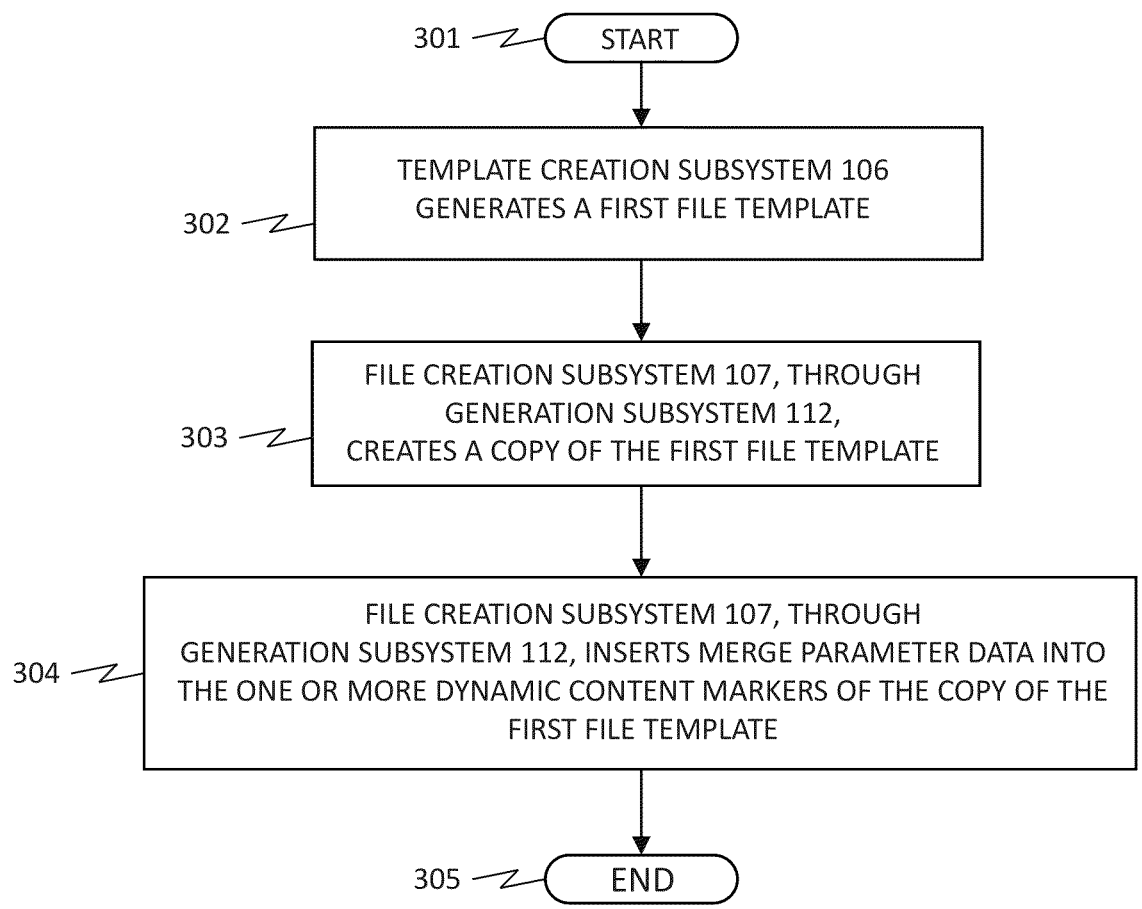
FIG. 3 is a flowchart of an exemplary method of generating files from file templates.

Referring now to FIG. 3, a flowchart illustrating a process of generating files from file templates. To start, as shown by block 302 of FIG. 3, the template creation subsystem 106 generates a first file template. After the template creation subsystem 106 generates the first file, as shown by block 303 of FIG. 3, the file creation subsystem 107, through generation subsystem 112, creates a copy of the first file template. After the file creation subsystem 107, through generation subsystem 112, inserts merge parameter data into the one or more dynamic content markers of the copy of the first file template.

Figure 4:
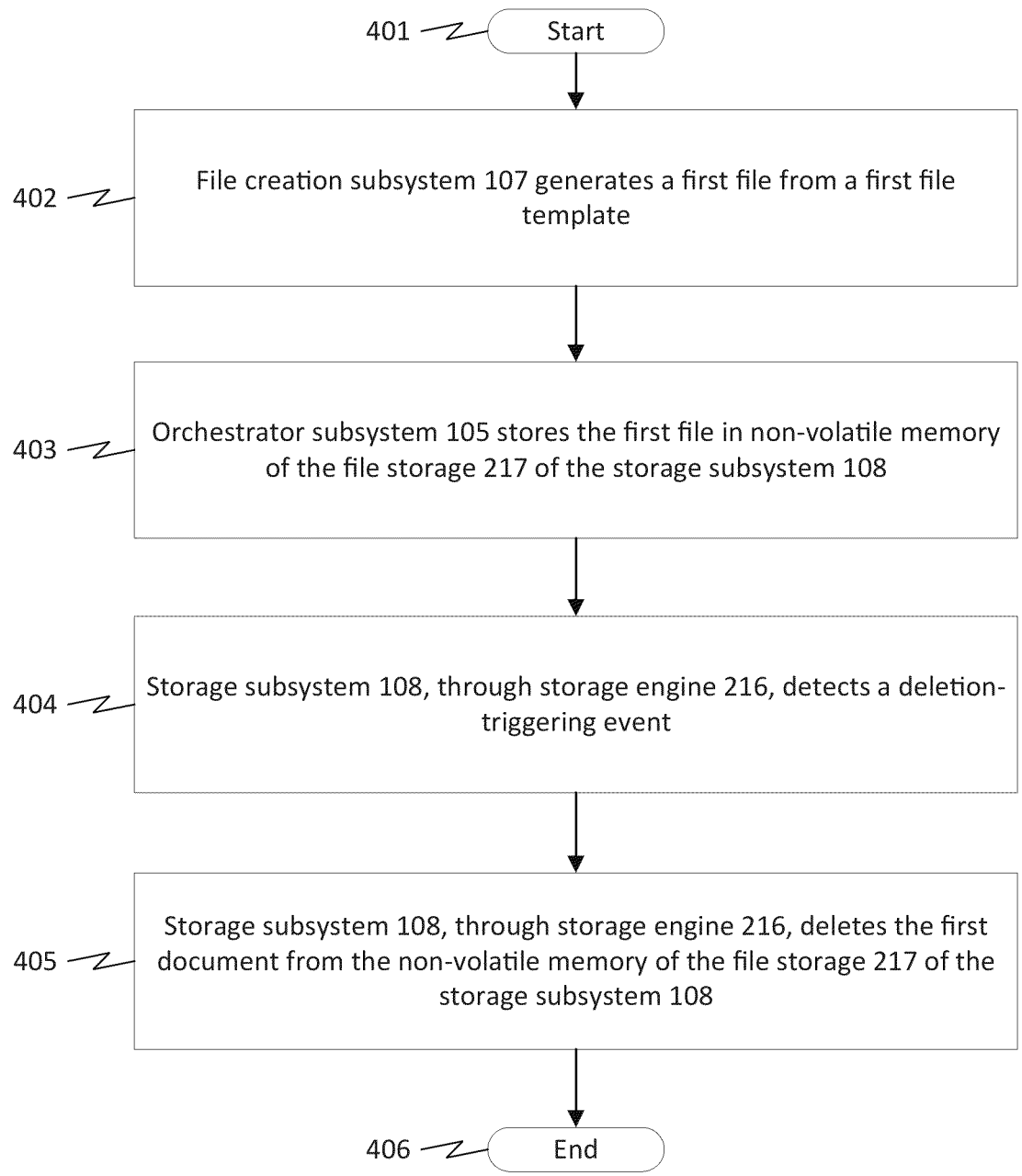
FIG. 4 is a flowchart of an exemplary method of managing the deletion of generated files.

Referring now to FIG. 4, a flowchart illustrating a process of managing the deletion of generated files. To start, as shown by block 402 of FIG. 4, the file creation subsystem 107 generates a first file from a first file template. After the file creation subsystem 107 generates the first file, as shown by block 403 of FIG. 4, the orchestrator subsystem 105 stores the first file in non-volatile memory of the file storage 217 of the storage subsystem 108. After the orchestrator subsystem 105 stores the first file in non-volatile memory of the file storage 207, as shown by block 404 of FIG. 4, the storage subsystem 108, through storage engine 216, may monitor for and eventually detect a deletion-triggering event. After the storage engine 216 detects a deletion-triggering event, as shown by block 405 of FIG. 4, the storage subsystem 108, through storage engine 216, deletes the first document from the non-volatile memory of the file storage 217 of the storage subsystem 108.

Figure 5:
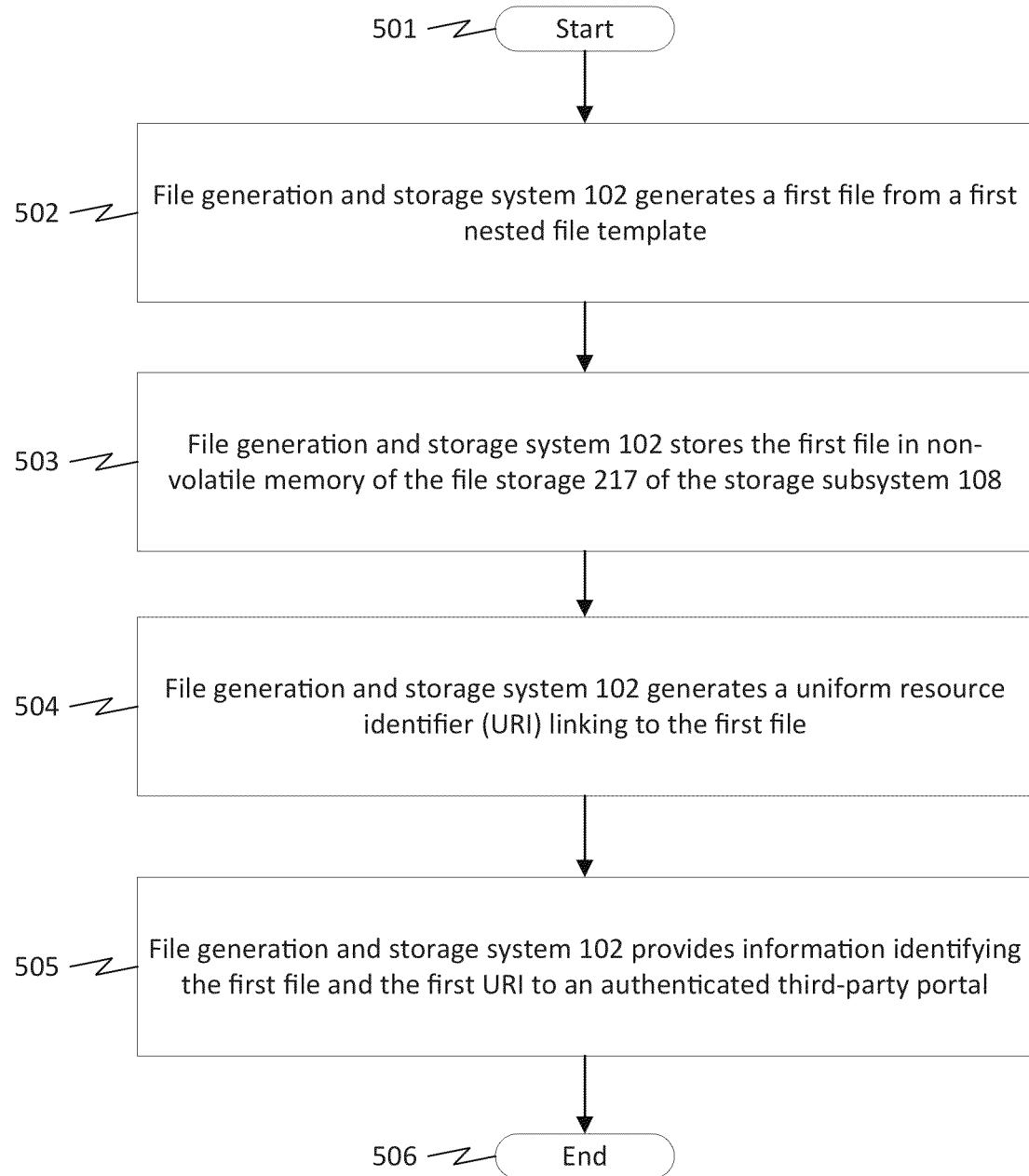
FIG. 5 is a flowchart of a first exemplary method of managing generated files.

Referring now to FIG. 5, a flowchart illustrating a first process of managing generated files. To start, as shown by block 502 of FIG. 5, the file generation and storage system 102 generates a first file from a first nested file template. After the file generation and storage system 102 generates the first file, as shown by block 503 of FIG. 5, the file generation and storage system 102 stores the first file in non-volatile memory of the file storage 217 of the storage subsystem 108. After the file generation and storage system 102 stores the first file in non-volatile memory, as shown by block 504 of FIG. 5, the file generation and storage system 102 generates a uniform resource identifier (URI) linking to the first file. After the file generation and storage system 102 generates the URI linking to the first file, as shown by block 505 of FIG. 5, the file generation and storage system 102 provides information identifying the first file and the first URI to an authenticated third-party portal.

Figure 6:
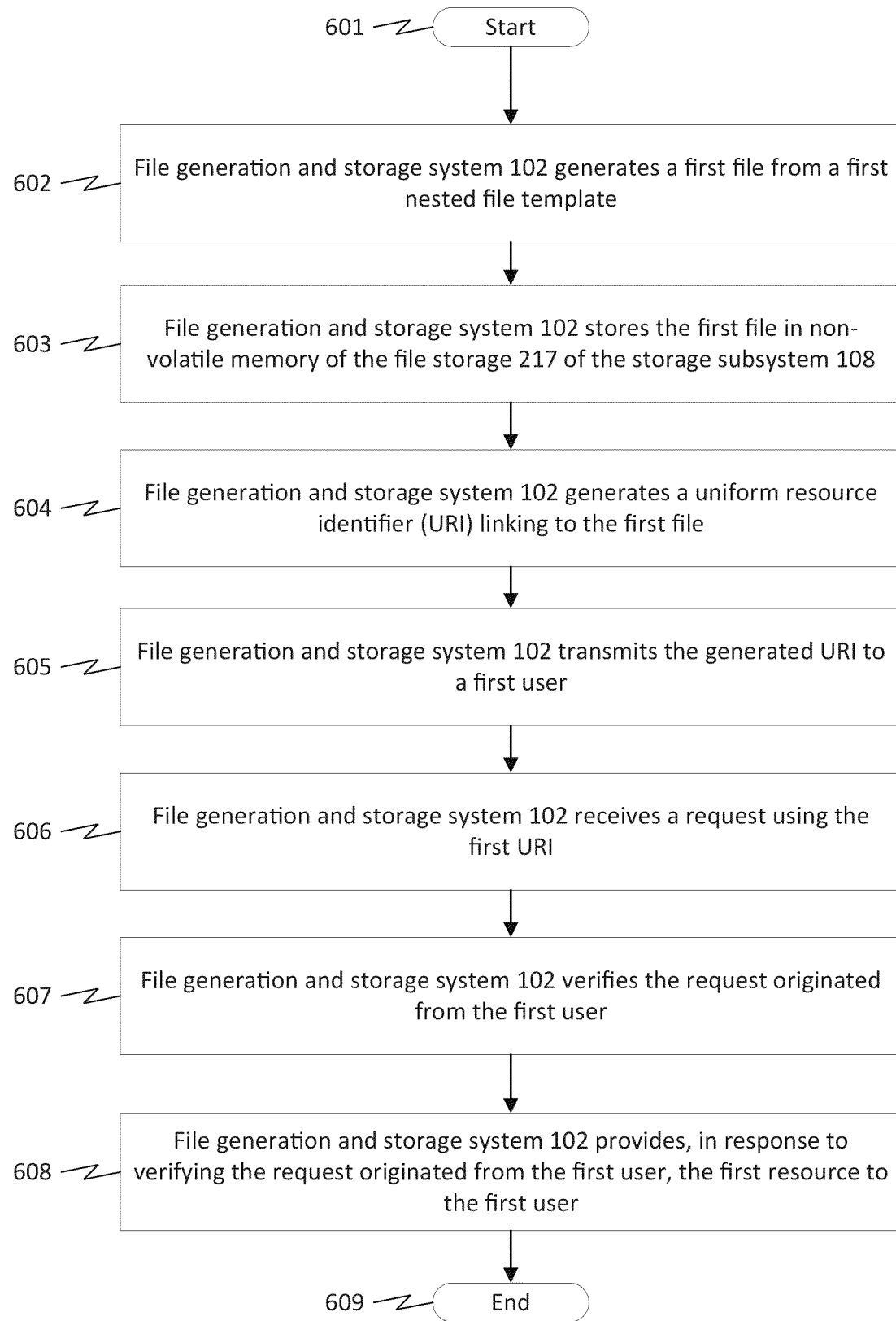
FIG. 6 is a flowchart of a second exemplary method of managing generated files.

Referring now to FIG. 6, a flowchart illustrating a second process of managing generated files. To start, as shown by block 602 of FIG. 6, the file generation and storage system 102 generates a first file from a first nested file template. After the file generation and storage system 102 generates the first file, as shown by block 603 of FIG. 6, the file generation and storage system 102 stores the first file in non-volatile memory of the file storage 217 of the storage subsystem 108. After the file generation and storage system 102 stores the first file in non-volatile memory, as shown by block 604 of FIG. 6, the file generation and storage system 102 generates a uniform resource identifier (URI) linking to the first file. After the file generation and storage system 102 generates the URI linking to the first file, as shown by block 605 of FIG. 6, the file generation and storage system 102 transmits the generated URI to a first user. After the file generation and storage system 102 transmits the URI to the first user, as shown by block 606 of FIG. 6, the file generation and storage system 102 may receive a request using the first URI. After the file generation and storage system 102 receives the request using the first URI, as shown by block 607 of FIG. 6, the file generation and storage system 102 may assess one or more parameters to verify the validity of the first request. After the file generation and storage system 102 verifies the validity of the received request, as shown by block 608 of FIG. 6, the file generation and storage system 102 may provide the first resource to the first user in response to the first request being verified.

Figure 7:
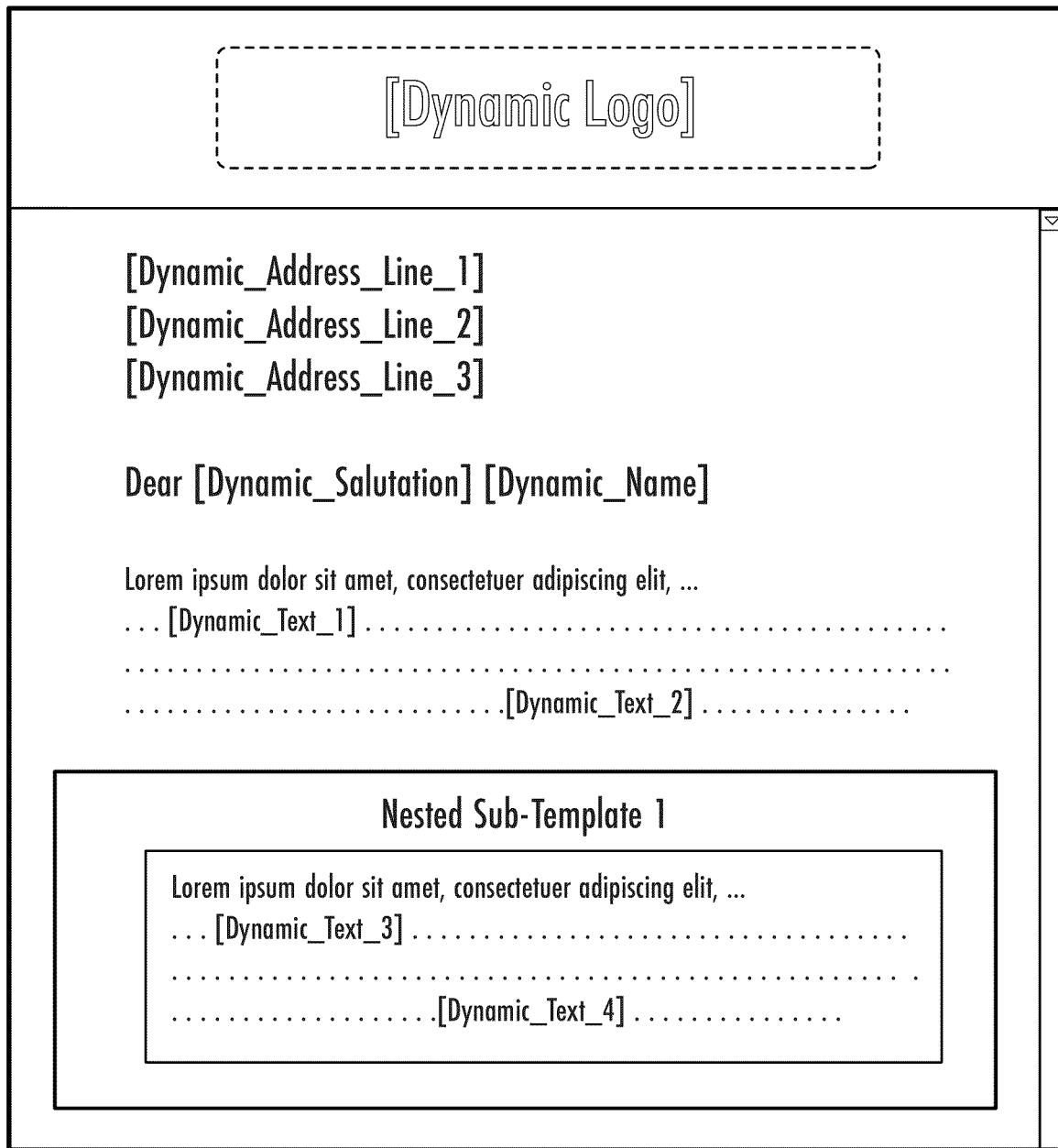
FIG. 7 is an illustration of the layout of an exemplary file template.

Referring now to FIG. 7, disclosing a schematic illustrating the layout of an exemplary file template. As shown by the figure, a file template may be comprised of one or more static elements, indicated here by text and dotted lines, and one or more dynamic elements, indicated by text in brackets. In the example template illustrated in FIG. 7, the dynamic elements comprise a dynamic logo, a dynamic address line 1, a dynamic address line 2, a dynamic address line 3, a dynamic salutation, a dynamic name 1, a dynamic name 2, a dynamic name 3, and a dynamic name 4. As also illustrated by the figure, a template may have one or more nested sub-templates, shown in figure three as nested sub-template 1.

Referring now to FIG. 8, disclosing a schematic illustrating the data structure of an exemplary file template. A file template may comprise any file, such as a text file, a word file, a pdf file, a markdown file, a Microsoft™ based file, a compressed file, or any other file to a standard operating system that is capable of receiving text input. As shown by the example FIG. 8, a file generation request made comprise various tuples of information, including a request type (i.e., "Request_Type,"), a file template ID (i.e., "Request_Type, "), a security template ID (i.e., "Security_Template_ID,"), a flow template ID (i.e., "Flow_Template_ID,"), a request type (i.e., "Request_Type,"), merge parameters (i.e., "Merge_Parameters,"), security parameters i.e., ("Security_Parameters,"), and flow parameters. (i.e., "Flow_Parameters").

Figure 9:
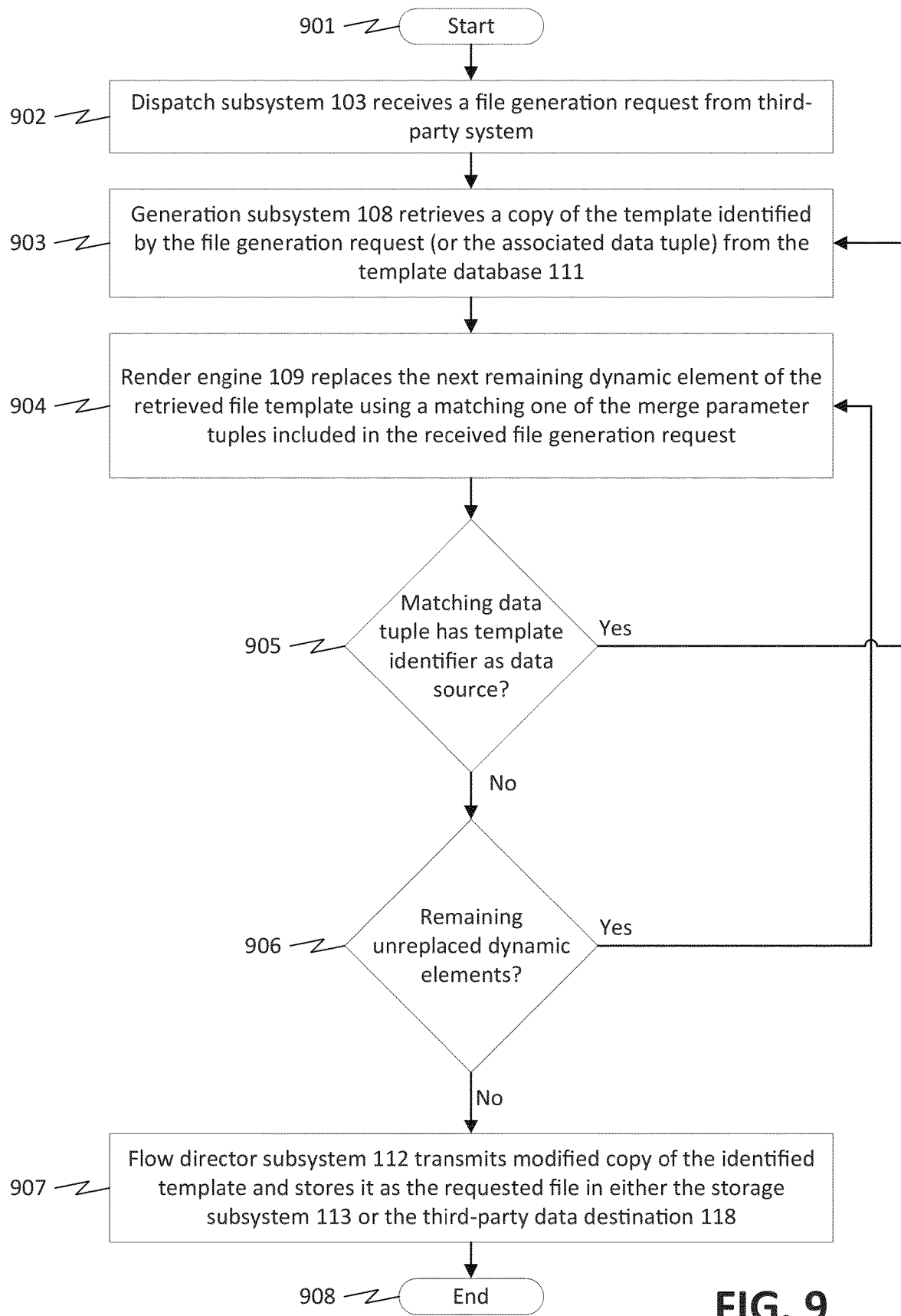
FIG. 9 is a flowchart of an exemplary method of generating a file from a file template.

Referring now to FIG. 9, a flowchart illustrating a process of generating a file. To start, as shown by block 902 of FIG. 9, dispatch subsystem 204 receives a file generation request from third-party system. After the dispatch subsystem 204 receives the file generation request, as shown by block 903 of FIG. 9, the generation subsystem 212 retrieves a copy of the template identified by the file generation request (or the associated data tuple) from the template database 218. After the render subsystem 212 retrieves the copy of the identified template, as shown by block 904 of FIG. 9, the render engine 213 modifies the template copy by replacing the dynamic elements of the template with the data from a matching merge parameter tuple. Specifically, for the render engine 213 replaces the next remaining dynamic element of the retrieved file template using a matching one of the merge parameter tuples included in the received file generation request If the matching merge parameter tuple has a first template identifier as its data source, as shown by block 905 of FIG. 9, the generation subsystem 212 returns to block 902 to recursively generate the identified nested sub-template. Otherwise, as shown by block 906 of FIG. 9, the generation subsystem 212 returns to step 904 if there are remaining unreplaced dynamic elements. Otherwise, the method proceeds to block 907. After all dynamic elements have been replaced, as shown by block 907 of FIG. 9, the flow director subsystem 215 transmits modified copy of the identified template and stores it as the requested file in either the storage subsystem 108 or the third-party data destination 221.

Figure 10:
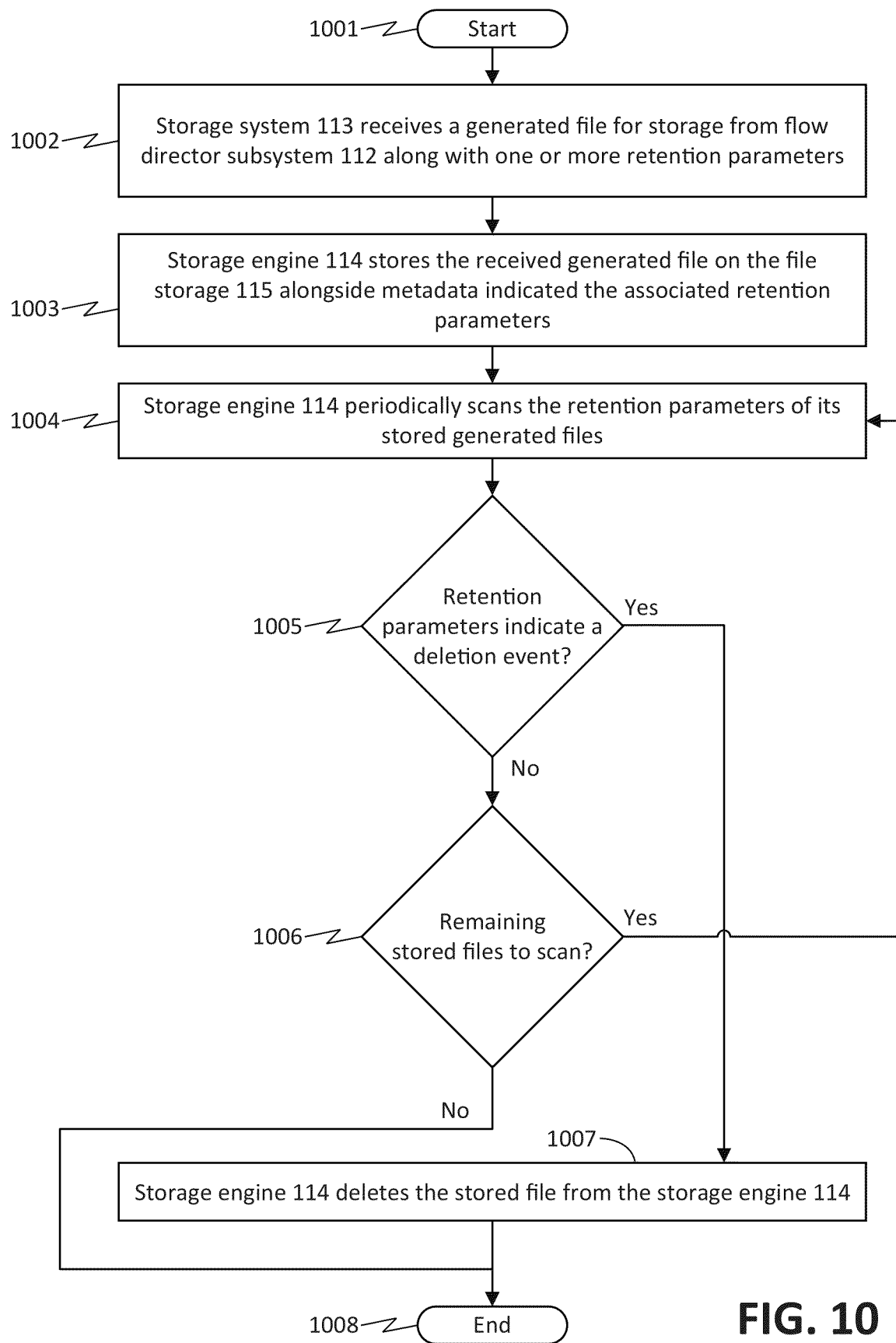
FIG. 10 is a flowchart of an exemplary method of storing a generated file.

Referring now to FIG. 10, a flowchart of an exemplary method of storing a generated file. To start, as shown by block 1002 of FIG. 10, the storage system 108 receives a generated file for storage from the flow director subsystem 215. The storage system 108 also receives information indicating one or more retention parameters for the received file. After the storage system 108 receives a generated file, as shown by block 1003 of FIG. 10, the storage engine 216 stores the received generated file on the file storage 217 alongside metadata indicated the associated retention parameters. After the storage engine 216 stores it, the received file on the file storage 217, as shown by block 1004 of FIG. 10, the storage engine 216 may periodically scan the retention parameters of its stored generated files, including the file just stored, to determine if their retention parameters indicate that a deletion-triggering event has occurred.

If the retention parameters of a stored file indicate a deletion-triggering event has occurred, as shown by block 1005 of FIG. 10, the method proceeds to block 1007. Otherwise, as shown by block 1006 of FIG. 10, if there are remaining stored files the storage engine 216 has queued for scanning, the method returns to block 1004 for the next remaining stored file to be scanned. Otherwise, the method ends.

If the retention parameters of a stored file indicate a deletion-triggering event has occurred, as shown by block 907, the storage engine 216 deletes the stored file from the storage engine 216. A deletion-triggering event may occur for any number of parameters, and including multiple parameters, such as times viewed, and duration of viewing a file. These may be set as parameters or variables and may form an algorithmic means of deletion and retention, such as an if then, or other rules based deterministic system. In one aspect, a deletion/retention parameter may be linked to a device's biometric engine (Face ID; Fingerprint). In other aspects, a deletion/retention parameter may be tied to an IP address, or accessed location, such an aspect may allow deletion if a sensitive file is set with such a parameter as to not open outside a given territory. Thus, this allows for combatting acts by foreign agents, and even nation states by placing security within file retention.

Figure 11:
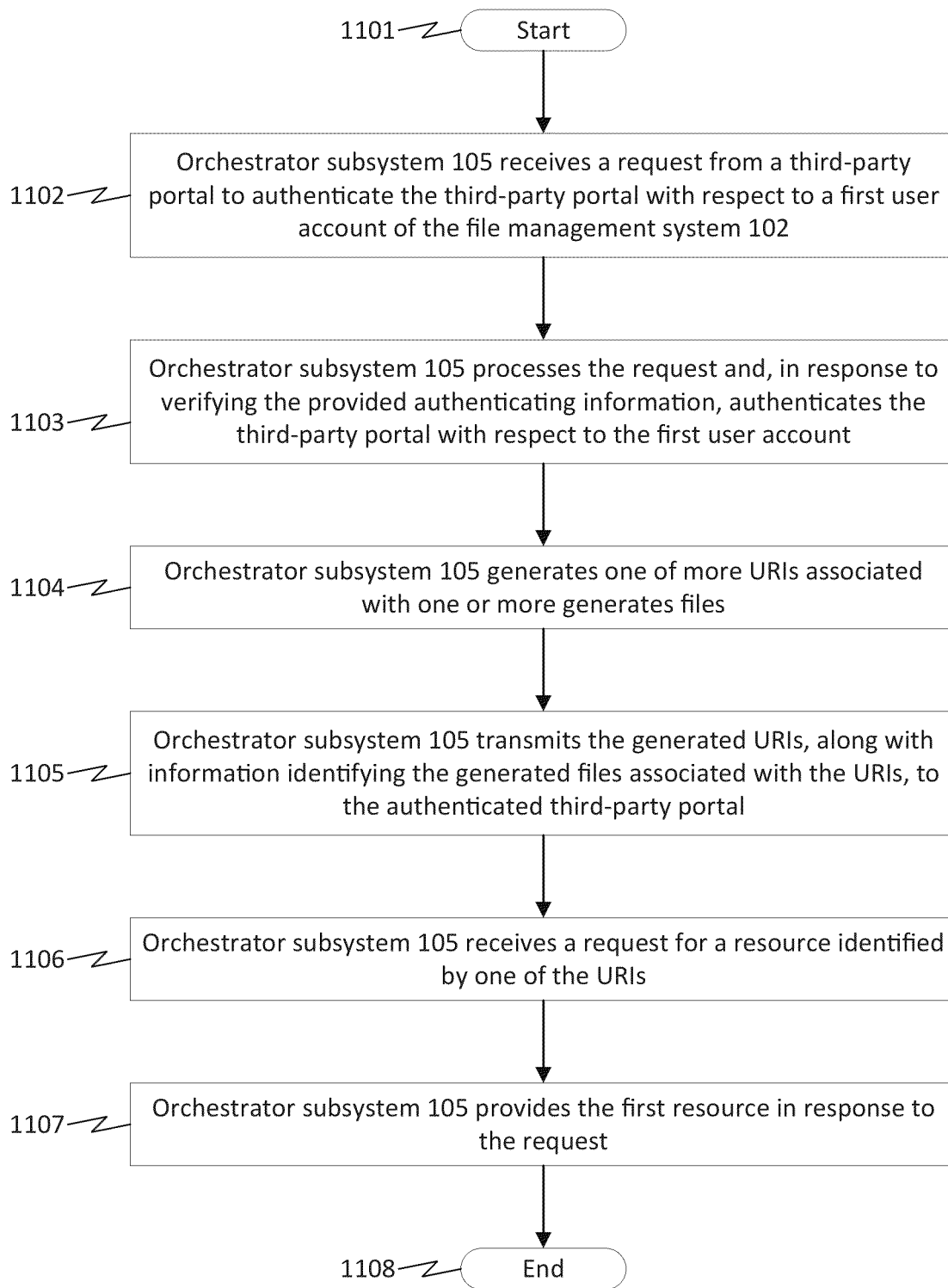
FIG. 11 is a flowchart of an exemplary method of controlling access to a stored file.

Referring now to FIG. 11, a flowchart of an exemplary method of controlling access to a stored file. To start, as shown by block 1102 of FIG. 11, the orchestrator subsystem 105 receives a request from a third-party portal to authenticate the third-party portal with respect to a first user account of the file management system 102. After the orchestrator subsystem 105 receives the authentication request, as shown by block 1103 of FIG. 11, the orchestrator subsystem 105 processes the request and, in response to verifying the provided authenticating information, authenticates the third-party portal with respect to the first user account. After the orchestrator subsystem 105 authenticates the third-party portal, as shown by block 1104 of FIG. 11, the orchestrator subsystem 105 generates one of more URIs associated with one or more generates files. After the orchestrator subsystem 105 generates the one or more URIs, as shown by block 1105 of FIG. 11, the orchestrator subsystem 105 transmits the generated URIs, along with information identifying the generated files associated with the URIs, to the authenticated third-party portal. After the orchestrator subsystem 105 transmits the URIs and related identifying information to the third-party portal, as shown by block 1106 of FIG. 11, the orchestrator subsystem 105 receives a request for a resource identified by one of the URIs. After the orchestrator subsystem 105 receives the request for the resource, as shown by block 1107 of FIG. 11, the orchestrator subsystem 105 provides the first resource in response to the request.

Figure 12:
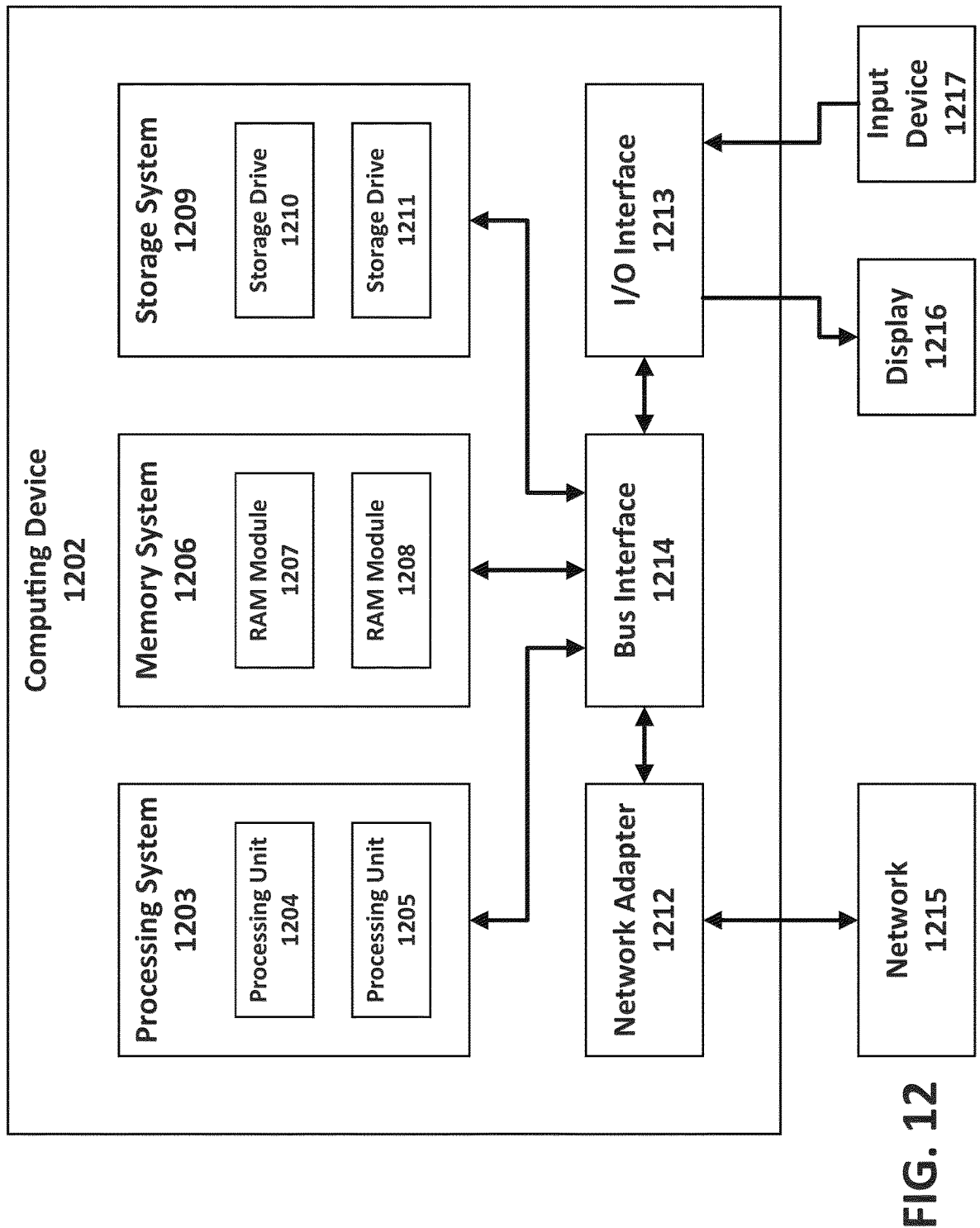
FIG. 12 is a block diagram of a computing device that may be a client device or server herein.

Referring now to FIG. 12, a block diagram of a computing device. As shown by the figure, a computing device 1202 may comprise a processing system 1203, a memory system 1206, a storage system 1209, a network adapter 1212, an input/output (IO) interface 1213, and a bus interface 1214. In turn, the processing system 1203 may comprise one or more processing units, shown here as processing units 1204, and 1205. Similarly, the memory system 1206 may comprise one or more RAM modules, shown here as RAM modules 1207 and 1208. Likewise, the storage system 1209 may comprise one or more storage drives, shown here as storage drives 1210 and 1211.

Generally speaking, the IO Interface 1213 may be connected to various peripheral devices, shown here as a display 1216 and an input device 1217. Similarly, the network adapter 1212 may connect to one or more external networks, shown here as network 1215.

Figure 13:
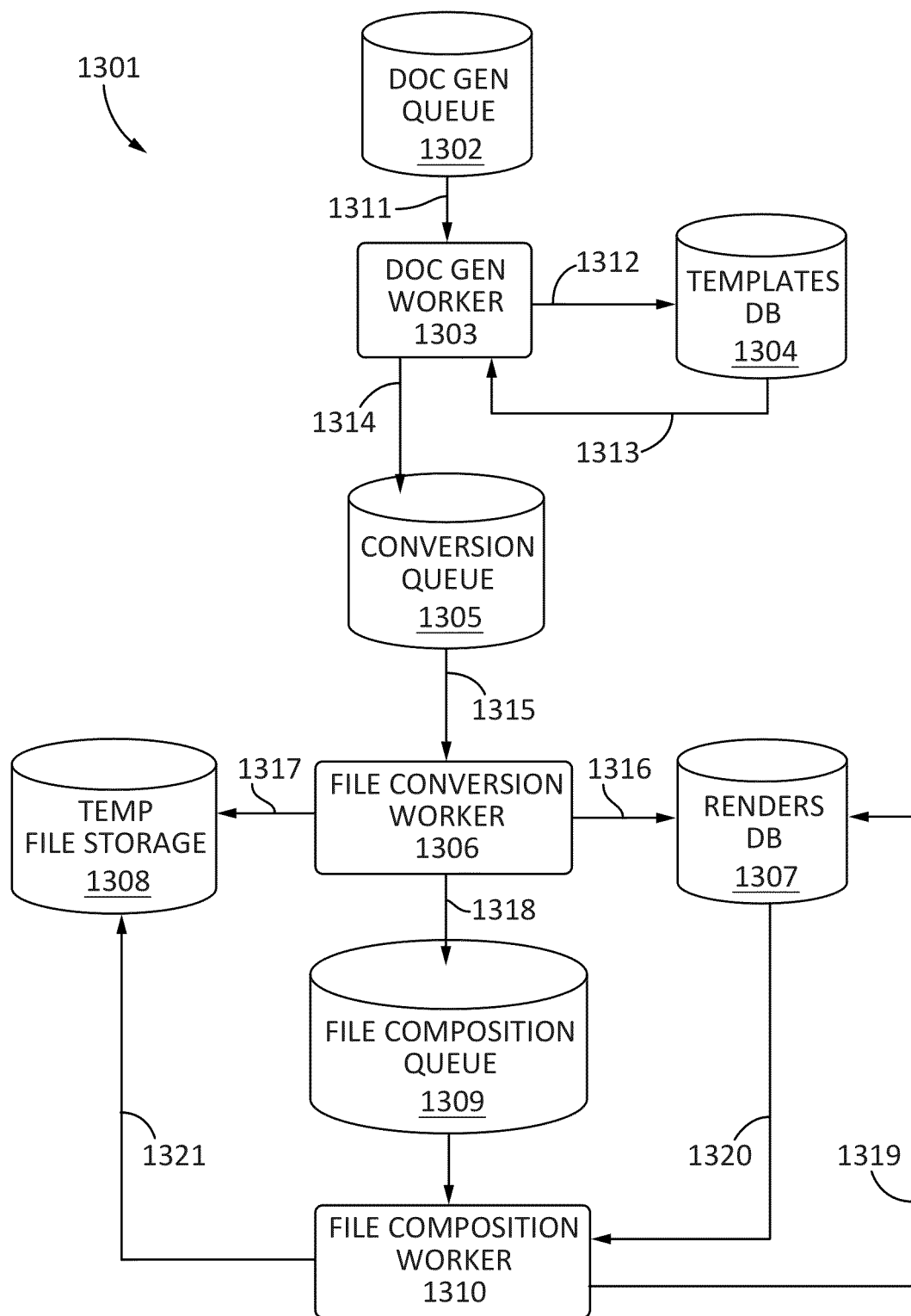
FIG. 13 is a block diagram of one aspect of a file creation subsystem.

Referring now to FIG. 13, a block diagram of one aspect of a file creation subsystem. As shown by the figure a file creation subsystem may comprise a doc gen queue 1302, a doc gen worker 1303, a template database 1304, a conversion queue 1305, a file conversion worker 1306, a renders DB 1307, a temp file storage 1308, a file composition queue 1309, and a file composition worker 1310.

Figure 14B:
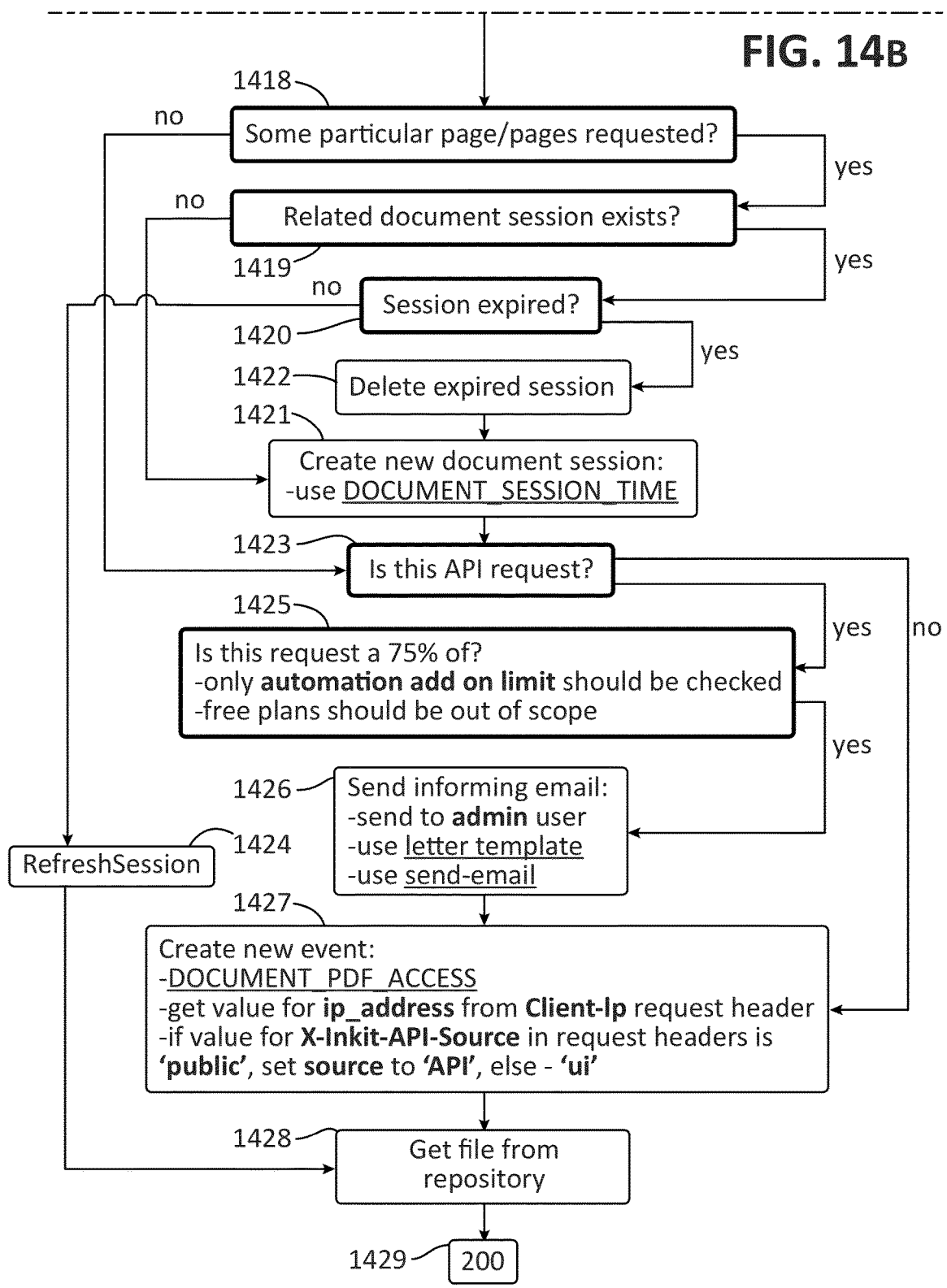

Referring now to FIG. 14AB, a flowchart of an exemplary method managing access to generated files. In the example, a check subscription 1402 is provided for access to the system, if granted 1403, proceed to check whether storage is available on the platform 1405. If the account has access to the features and permissions are accepted specify files or documents and a type of action 1408. The system verifies permissions based on parameters 1410. The system verifies documents exist in repository or database 1411, if no file located 404 provide alert 1411a. Otherwise, proceed to check if user/api-user has access level read to related documents folder 1412. The system performs access level check based on parameters, including credentials submitted 1413, and if not available 1414 alert user through system, otherwise the system checks whether files or documents have expired 1415, if document has expired the system performs deletion or erasure 1416, and may log such triggering-event that set deletion or erasure. Steps 1418-1422 relate to a check of the system as to whether a file or document exists, whether the user session is active, and if the file does not exist prompts to create a new document 1421. The system checks to see if the request arrives from another platform via an API 1423, or if originates within system. The system will then send an email user 1426 with access credentials to the file or document 1427. The user then may access the system file repository to view the file or document 1428. The system then prompts the main menu 1429 and file access 200.

Figure 15:
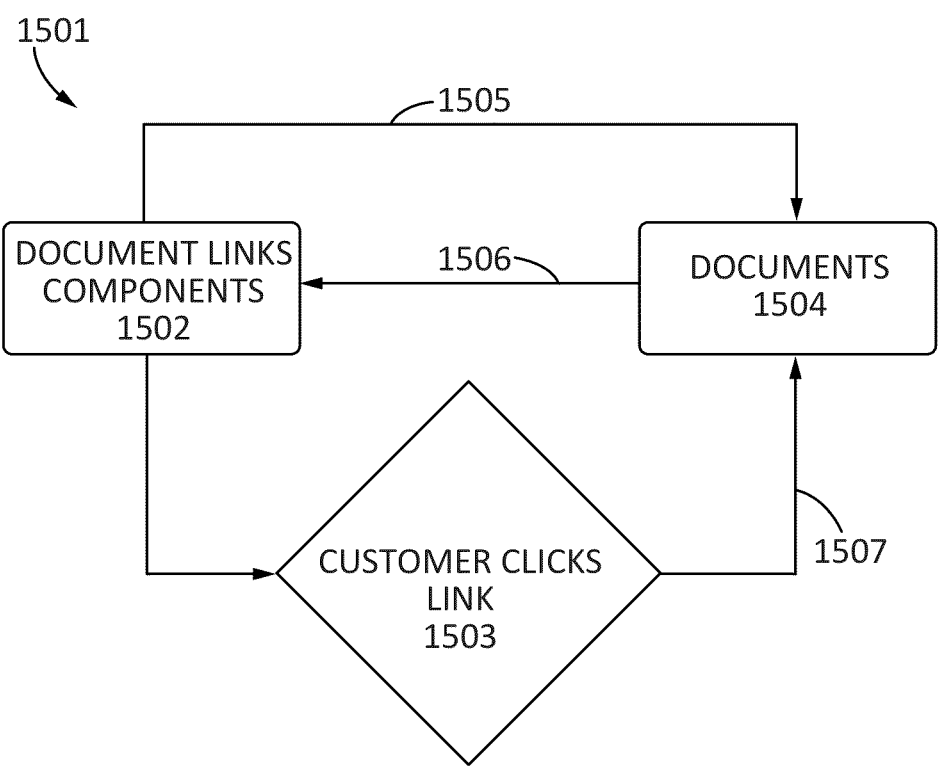
FIG. 15 is a sequence diagram of one aspect of an orchestrator subsystem.

FIG. 15 is a sequence diagram of one aspect of an orchestrator subsystem 1501. In the example, the orchestrator comprises a routine for verifying access control and deletion, amongst other subsystems, including monitoring for customer link clicks 1503, which in turn provides documents 1504 upon verification of credentials by accessing 1506 document link components 1502. The document link components provide credential verification 1505 to access the documents, including enforcing retention policies.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media, like the computer-readable media described above. Such software, when executed by a processor, may perform the function of the device, module or other functional unit the software is implementing. The above described devices, modules, and other functions units may also be combined or may be further divided into a plurality of sub-units.

In some places reference is made to standards, including standard methods of performing some task. These standards are revised from time to time, and, unless explicitly stated otherwise, reference to standards in this disclosure refer to the most recent published standard as of the time of filing.

Spatially relative terms, such as "under", "below", "lower", "over", "upper" and the like, may be used herein for ease of description to describe one element or feature's relationship to another when the apparatus is right side up.

When a feature is referred to as being "on" another feature, the feature may be directly on the other feature with no intervening features present or it may be indirectly on the other feature with intervening features being present. In contrast, when a feature is referred to as being "directly on" another feature, the feature is directly on the other feature with no intervening features present. It will also be understood that, when a feature is referred to as being "connected", "attached" or "coupled" to another feature, the feature may be directly connected, attached or coupled to the other feature with no intervening features present or it may be indirectly connected, attached or coupled to the other feature with intervening features being present. In contrast, when a feature is referred to as being "directly connected", "directly attached" or "directly coupled" to another feature, the feature is directly connected, directly attached, or directly coupled to the other feature with not intervening features present.

The terms "about" and "approximately" shall generally mean an acceptable degree of error or variation for the quantity measured given the nature or precision of the measurements. Typical, exemplary degrees of error or variation are within 20%, preferably within 10%, more preferably within 5%, and still more preferably within 1% of a given value or range of values. Numerical quantities given in this description are approximate unless stated otherwise, meaning that the term "about" or "approximately" can be inferred when not expressly stated.

Ordinal numbers or terms such as "first" and "second" are used only to differentiate an entity or operation from another entity or operation, and do not require or imply any actual relationship or sequence between these entities or operations. Thus, a first feature or element could be termed a second feature or element, and similarly, a second feature or element could be termed a first feature or element without departing from the teachings of the present disclosure. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the terms "or" and "at least one of" encompasses all possible combinations, except where infeasible. For example, if it is stated that a component may include "A or B," then, unless specifically stated otherwise or infeasible, the component may include "A," "B," or "A and B." As a second example, if it is stated that a component includes "at least one of A, B, or C," then, unless specifically stated otherwise or infeasible, the component may include "A," "B," "C," "A and B," "A and C," "B and C," or "A, B, and C." This same construction applies to longer lists (e.g., "may include A, B, C, or D").

As used herein, the singular forms "a", "an," and "the" are intended to include the plural forms as well, unless the context clearly indicates otherwise.

Any given element or step of the embodiments disclosed above may be embodied in a single element or step or may be embodied in multiple elements or steps. Moreover, any given element or step of the embodiments disclosed above may be combined and embodied in single element or step or may be combined and embodied in multiple elements or steps.

The sequence of steps shown in the various figures are only for illustrative purposes and do not necessarily indicate that embodiments of the present disclosure are limited to any particular sequence of steps. As such, steps performed by various embodiments of the present disclosure can be performed in a different order while implementing the same method.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The disclosure provided herein is further described in the following implementation clauses:

Clause 1. A method for managing access to generated files, comprising: storing by a server a file in non-volatile memory; receiving by the server from a first client device a request to generate a uniform resource identifier (URI), wherein the first URI is associated with the file, an identity, and a dynamic expire time; generating at the server a uniform resource identifier (URI) associated with the file, wherein the URI links to a resource comprising the file and is generated at the server; transmitting by the server at the request of the first client device the URI to a second client device; receiving at the server from the second client device the request using the URI to request the resource; validating the identity through the server as an authorized identity, wherein the server checks the identity as being contained in a database of authorized identities in the server; validating the identity through an identity provider, wherein the identity provider requests a user to login to the identity on an identity hosting platform; and granting or denying access to the resource based on a response from the server and the identity provider.

Clause 2. The method of clause 1, wherein the identity may comprise an email, a login, a username, or a phone number.

Clause 3. The method of clause 1, further comprising: validating a dynamic expire time associated with the URI, wherein the dynamic expire time associated with the URI may comprise a first length of time after creation of the URI, or a second length of time after the URI is first used; and granting or denying access to the resource based on the validating of the dynamic expire time associated with the URI.

Clause 4. The method of clause 1, further comprising providing, in response to granting access to the resource, the resource to the second client device, wherein providing the resource to the second client device comprises providing the file to the second client device.

Clause 5. The method of clause 1, the method further comprising: receiving at the server a file creation request; and generating, in response to receiving the file creation request, the file from a file template, wherein the file is generated at the server.

Clause 6. The method of clause 5, the method further comprising: receiving at the server a file template creation request; and generating, in response to receiving the file template creation request, the file template with static content data and dynamic content markers, wherein the file template is generated at the server.

Clause 7. The method of clause 5, wherein: the file template comprises static content data and one or more dynamic content markers; the file template is a nested file template; and generating the file from the file template comprises: creating a copy of the file template with the static content data and the one or more dynamic content markers, wherein the one or more dynamic content markers of the file template are each associated with a respective merge parameter identifier; and inserting merge parameter data into the one or more dynamic content markers of the copy of the file template using a set of one or more merge parameter data structures, wherein: the set of one or more merge parameter data structures each comprise a respective merge parameter identifier and a respective merge parameter data source; and the merge parameter data is obtained from one or more respective merge parameter data sources.

Clause 8. A file management system, comprising: a server, wherein the server is configured to: store a file in non-volatile memory; receive from a first client device a request to generate a uniform resource identifier (URI), wherein the first URI is associated with the file, an identity, and a dynamic expire time; generate a uniform resource identifier (URI) associated with the file, wherein the URI links to a resource comprising the file; transmit at the request of the first client device the URI to a second client device; receive, from a second client device, a request using the URI to request the resource; validate the identity as an authorized identity, wherein the server checks the identity as being contained in a database of authorized identities on the server; validate the identity through an identity provider, wherein the identity provider requests a login to the identity on an identity hosting platform; and grant or deny access to the resource based on a response from the server and the identity provider.

Clause 9. The system of clause 8, wherein the identity may comprise an email, a login, a username, or a phone number.

Clause 10. The system of clause 8, wherein the server is further configured to: validate a dynamic expire time associated with the URI, wherein the dynamic expire time associated with the URI may comprise a first length of time after creation of the URI or a second length of time after the URI is first used; and grant or deny access to the resource based on the validation of the dynamic expire time associated with the URI.

Clause 11. The system of clause 8, wherein: the server is further configured to provide, in response to granting access to the resource, the resource to the second client device; and wherein providing the resource to the second client device comprises, providing the file to the second client device.

Clause 12. The system of clause 8, wherein the server is further configured to: receive a file creation request; and generate, in response to receiving the file creation request, the file from a file template.

Clause 13. The system of clause 12, wherein the server is further configured to: receive a file template creation request; and generating, in response to receiving the file template creation request, the file template with static content data and dynamic content markers.

Clause 14. The system of clause 12, wherein: the file template comprises static content data and one or more dynamic content markers; the file template is a nested file template; and generating the file from the file template comprises: creating a copy of the file template with the static content data and the dynamic content markers, wherein the one or more dynamic content markers of the file template are each associated with a respective merge parameter identifier; and inserting merge parameter data into the one or more dynamic content markers of the copy of the file template using a set of one or more merge parameter data structures, wherein: the set of one or more merge parameter data structures each comprise a respective merge parameter identifier and a respective merge parameter data source; and the merge parameter data is obtained from one or more respective merge parameter data sources.

Clause 15. A non-transitory computer readable medium comprising instructions that, when executed by one or more processors, cause the one or more processors to control access to generated files by: storing by a server a file in non-volatile memory; receiving by the server from a first client device a request to generate a uniform resource identifier (URI), wherein the first URI is associated with the file, an identity, and a dynamic expire time; generating at the server a uniform resource identifier (URI) associated with the file, wherein the URI links to a resource comprising the file and is generated at the server; transmitting by the server at the request of the first client device the URI to a second client device; receiving at the server from a second client device a request using the URI to request the resource; validating the identity through the server as an authorized identity, wherein the server checks the identity as being contained in a database of authorized identities in the server; validating the identity through an identity provider, wherein the identity provider requests a login to the identity on an identity hosting platform; and granting or denying access to the resource based on a response from the server and the identity provider.

Clause 16. The non-transitory computer readable medium of clause 15, wherein the identity may comprise an email, a login, a username, or a phone number.

Clause 17. The non-transitory computer readable medium of clause 15, wherein the instructions further cause the one or more processors to control access to generated files by: validating a dynamic expire time associated with the URI, wherein the dynamic expire time associated with the URI may comprise a first length of time after creation of the URI or a second length of time after the URI is first used; and granting or denying access to the resource based on the validating of the dynamic expire time associated with the URI.

Clause 18. The non-transitory computer readable medium of clause 15, wherein the instructions further cause the at least one processor to control access to generated files by providing, in response to granting access to the resource, the resource to the second client device, wherein providing the resource to the second client device comprises providing the file to the second client device.

Clause 19. The non-transitory computer readable medium of clause 15, wherein the instructions further cause the one or more processors to control access to generated files by: receiving at the server a file creation request; and generating, in response to receiving the file creation request, the file from a file template, wherein the file is generated at the server.

Clause 20. The non-transitory computer readable medium of clause 19, wherein: the file template comprises static content data and one or more dynamic content markers; the file template is a nested file template; and generating the file from the file template comprises: creating a copy of the file template with the static content data and the dynamic content markers, wherein the one or more dynamic content markers of the file template are each associated with a respective merge parameter identifier; and inserting merge parameter data into the one or more dynamic content markers of the copy of the file template using a set of one or more merge parameter data structures, wherein: the set of one or more merge parameter data structures each comprise a respective merge parameter identifier and a respective merge parameter data source; and the merge parameter data is obtained from one or more respective merge parameter data sources.

Now, therefore, the following is claimed:
1. A method for managing access to generated files, comprising:
storing by a server a file in non-volatile memory;
receiving by the server from a first client device a request to generate a uniform resource identifier (URI), wherein the first URI is associated with the file, an identity, and a dynamic expire time;
generating at the server a uniform resource identifier (URI) associated with the file, wherein the URI links to a resource comprising the file and is generated at the server;
transmitting by the server at the request of the first client device the URI to a second client device;
receiving at the server from the second client device the request using the URI to request the resource;
validating the identity through the server as an authorized identity, wherein the server checks the identity as being contained in a database of authorized identities in the server;
validating the identity through an identity provider, wherein the identity provider requests a user to login to the identity on an identity hosting platform; and
granting or denying access to the resource based on a response from the server and the identity provider.

2. The method of claim 1, wherein the identity may comprise an email, a login, a username, or a phone number.

3. The method of claim 1, further comprising:
validating a dynamic expire time associated with the URI, wherein the dynamic expire time associated with the URI may comprise a first length of time after creation of the URI, or a second length of time after the URI is first used; and
granting or denying access to the resource based on the validating of the dynamic expire time associated with the URI.

4. The method of claim 1, further comprising providing, in response to granting access to the resource, the resource to the second client device, wherein providing the resource to the second client device comprises providing the file to the second client device.

5. The method of claim 1, the method further comprising:
receiving at the server a file creation request; and
generating, in response to receiving the file creation request, the file from a file template, wherein the file is generated at the server.

6. The method of claim 5, the method further comprising:
receiving at the server a file template creation request; and
generating, in response to receiving the file template creation request, the file template with static content data and dynamic content markers, wherein the file template is generated at the server.

7. The method of claim 5, wherein:
the file template comprises static content data and one or more dynamic content markers;
the file template is a nested file template; and
generating the file from the file template comprises:
creating a copy of the file template with the static content data and the one or more dynamic content markers, wherein the one or more dynamic content markers of the file template are each associated with a respective merge parameter identifier; and
inserting merge parameter data into the one or more dynamic content markers of the copy of the file template using a set of one or more merge parameter data structures, wherein:
the set of one or more merge parameter data structures each comprise a respective merge parameter identifier and a respective merge parameter data source; and
the merge parameter data is obtained from one or more respective merge parameter data sources.

8. A file management system, comprising:
a server, wherein the server is configured to:
store a file in non-volatile memory;
receive from a first client device a request to generate a uniform resource identifier (URI), wherein the first URI is associated with the file, an identity, and a dynamic expire time;
generate a uniform resource identifier (URI) associated with the file, wherein the URI links to a resource comprising the file;
transmit at the request of the first client device the URI to a second client device;
receive, from a second client device, a request using the URI to request the resource;
validate the identity as an authorized identity, wherein the server checks the identity as being contained in a database of authorized identities on the server;
validate the identity through an identity provider, wherein the identity provider requests a login to the identity on an identity hosting platform; and
grant or deny access to the resource based on a response from the server and the identity provider.

9. The system of claim 8, wherein the identity may comprise an email, a login, a username, or a phone number.

10. The system of claim 8, wherein the server is further configured to:
validate a dynamic expire time associated with the URI, wherein the dynamic expire time associated with the URI may comprise a first length of time after creation of the URI or a second length of time after the URI is first used; and
grant or deny access to the resource based on the validation of the dynamic expire time associated with the URI.

11. The system of claim 8, wherein:
the server is further configured to provide, in response to granting access to the resource, the resource to the second client device; and
wherein providing the resource to the second client device comprises, providing the file to the second client device.

12. The system of claim 8, wherein the server is further configured to:
receive a file creation request; and
generate, in response to receiving the file creation request, the file from a file template.

13. The system of claim 12, wherein the server is further configured to:
receive a file template creation request; and
generating, in response to receiving the file template creation request, the file template with static content data and dynamic content markers.

14. The system of claim 12, wherein:
the file template comprises static content data and one or more dynamic content markers;
the file template is a nested file template; and
generating the file from the file template comprises:
creating a copy of the file template with the static content data and the dynamic content markers, wherein the one or more dynamic content markers of the file template are each associated with a respective merge parameter identifier; and
inserting merge parameter data into the one or more dynamic content markers of the copy of the file template using a set of one or more merge parameter data structures, wherein:

the set of one or more merge parameter data structures each comprise a respective merge parameter identifier and a respective merge parameter data source; and the merge parameter data is obtained from one or more respective merge parameter data sources.

15. A non-transitory computer readable medium comprising instructions that, when executed by one or more processors, cause the one or more processors to control access to generated files by:

storing by a server a file in non-volatile memory;

receiving by the server from a first client device a request to generate a uniform resource identifier (URI), wherein the first URI is associated with the file, an identity, and a dynamic expire time;

generating at the server a uniform resource identifier (URI) associated with the file, wherein the URI links to a resource comprising the file and is generated at the server;

transmitting by the server at the request of the first client device the URI to a second client device;

receiving at the server from a second client device a request using the URI to request the resource;

validating the identity through the server as an authorized identity, wherein the server checks the identity as being contained in a database of authorized identities in the server;

validating the identity through an identity provider, wherein the identity provider requests a login to the identity on an identity hosting platform; and granting or denying access to the resource based on a response from the server and the identity provider.

16. The non-transitory computer readable medium of claim 15, wherein the identity may comprise an email, a login, a username, or a phone number.

17. The non-transitory computer readable medium of claim 15, wherein the instructions further cause the one or more processors to control access to generated files by:

validating a dynamic expire time associated with the URI, wherein the dynamic expire time associated with the URI may comprise a first length of time after creation of the URI or a second length of time after the URI is first used; and granting or denying access to the resource based on the validating of the dynamic expire time associated with the URI.

18. The non-transitory computer readable medium of claim 15, wherein the instructions further cause the at least one processor to control access to generated files by providing, in response to granting access to the resource, the resource to the second client device, wherein providing the resource to the second client device comprises providing the file to the second client device.

19. The non-transitory computer readable medium of claim 15, wherein the instructions further cause the one or more processors to control access to generated files by:

receiving at the server a file creation request; and generating, in response to receiving the file creation request, the file from a file template, wherein the file is generated at the server.

20. The non-transitory computer readable medium of claim 19, wherein:

the file template comprises static content data and one or more dynamic content markers;

the file template is a nested file template; and generating the file from the file template comprises:

creating a copy of the file template with the static content data and the dynamic content markers, wherein the one or more dynamic content markers of the file template are each associated with a respective merge parameter identifier; and inserting merge parameter data into the one or more dynamic content markers of the copy of the file template using a set of one or more merge parameter data structures, wherein:

the set of one or more merge parameter data structures each comprise a respective merge parameter identifier and a respective merge parameter data source; and the merge parameter data is obtained from one or more respective merge parameter data sources.

* * * * *